United States Patent
Fukuzawa et al.

(10) Patent No.: US 10,233,974 B2
(45) Date of Patent: Mar. 19, 2019

(54) TRIPOD-TYPE CONSTANT VELOCITY JOINT

(71) Applicant: NTN CORPORATION, Osaka (JP)

(72) Inventors: Satoru Fukuzawa, Mie (JP); Kenji Yamaoka, Mie (JP); Ikuma Fujitsuka, Tokyo (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/127,118

(22) PCT Filed: Mar. 20, 2015

(86) PCT No.: PCT/JP2015/058503
§ 371 (c)(1),
(2) Date: Sep. 19, 2016

(87) PCT Pub. No.: WO2015/141834
PCT Pub. Date: Sep. 24, 2015

(65) Prior Publication Data
US 2017/0122377 A1    May 4, 2017

(30) Foreign Application Priority Data

Mar. 20, 2014   (JP) ................... 2014-057745
Mar. 20, 2014   (JP) ................... 2014-058252
Sep. 5, 2014    (JP) ................... 2014-181247

(51) Int. Cl.
*F16D 3/202*     (2006.01)
*F16D 3/72*      (2006.01)
*F16D 3/205*     (2006.01)

(52) U.S. Cl.
CPC .............. *F16D 3/2055* (2013.01); *F16D 3/72* (2013.01)

(58) Field of Classification Search
CPC ........ F16D 3/202; F16D 3/205; F16D 3/2052; F16D 3/2055; F16D 3/2057; F16D 3/72; Y10S 464/905
(Continued)

(56) References Cited

U.S. PATENT DOCUMENTS 2,125,615 A      8/1935   Kittredge
2,895,314 A *    7/1959   Helm .................. F16D 3/20
                                                          464/153
(Continued)

FOREIGN PATENT DOCUMENTS

FR    2240658 A5 *   3/1975   ........... F16D 3/2052
FR    2243614 A5 *   4/1975   ........... F16D 3/2052
(Continued)

OTHER PUBLICATIONS

Translation of JP 2007-255511. Fukuzawa, et al. Tripod Type Constant Velocity Joint. Oct. 4, 2007.*
(Continued)

*Primary Examiner* — Josh Skroupa
(74) *Attorney, Agent, or Firm* — Wenderoth, Lind & Ponack, L.L.P.

(57) ABSTRACT

A tripod-type constant velocity joint includes an intermediate member, and first and second tripod members connected to the respective ends of the intermediate member. The intermediate member includes first and second outer rings. The first tripod member is formed with three protrusions, and the second tripod member is formed with three protrusions. The first outer ring is formed in its inner periphery with three axially extending first track grooves which are open at its axial end surface. The second outer ring is formed in its inner periphery with three axially extending second track grooves which are open at its axial end surface. The protrusions of the first tripod member are axially slidably (Continued)

received in the respective first track grooves. The protrusions of the second tripod member are axially slidably received in the respective second track grooves.

17 Claims, 15 Drawing Sheets

(58) Field of Classification Search
USPC ............... 464/111, 114–116, 153, 182, 905
See application file for complete search history.

(56) References Cited

U.S. PATENT DOCUMENTS

| | | | | |
|---|---|---|---|---|
| 3,906,747 | A * | 9/1975 | Orain | F16D 3/2055 464/111 |
| 4,273,209 | A * | 6/1981 | Orain | F16D 3/2055 464/111 |
| 7,232,000 | B2 * | 6/2007 | Brossard | F16D 3/205 464/111 |
| 7,289,752 | B2 * | 10/2007 | Yamazaki | G03G 15/757 464/111 |

FOREIGN PATENT DOCUMENTS

| | | | | |
|---|---|---|---|---|
| GB | 596945 | A * | 1/1948 | ........... F16D 3/2052 |
| JP | 53-34043 | | 3/1978 | |
| JP | 58039819 | A * | 3/1983 | ............... F16D 3/34 |
| JP | 2007-139084 | | 6/2007 | |
| JP | 2007-255511 | | 10/2007 | |
| JP | 2009-58735 | | 3/2009 | |

OTHER PUBLICATIONS

International Search Report dated Apr. 28, 2015 in International (PCT) Application No. PCT/JP2015/058503.
English translation of the International Preliminary Report on Patentability and the Written Opinion of the International Searching Authority dated Sep. 20, 2016 in International Application No. PCT/JP2015/058503.

* cited by examiner

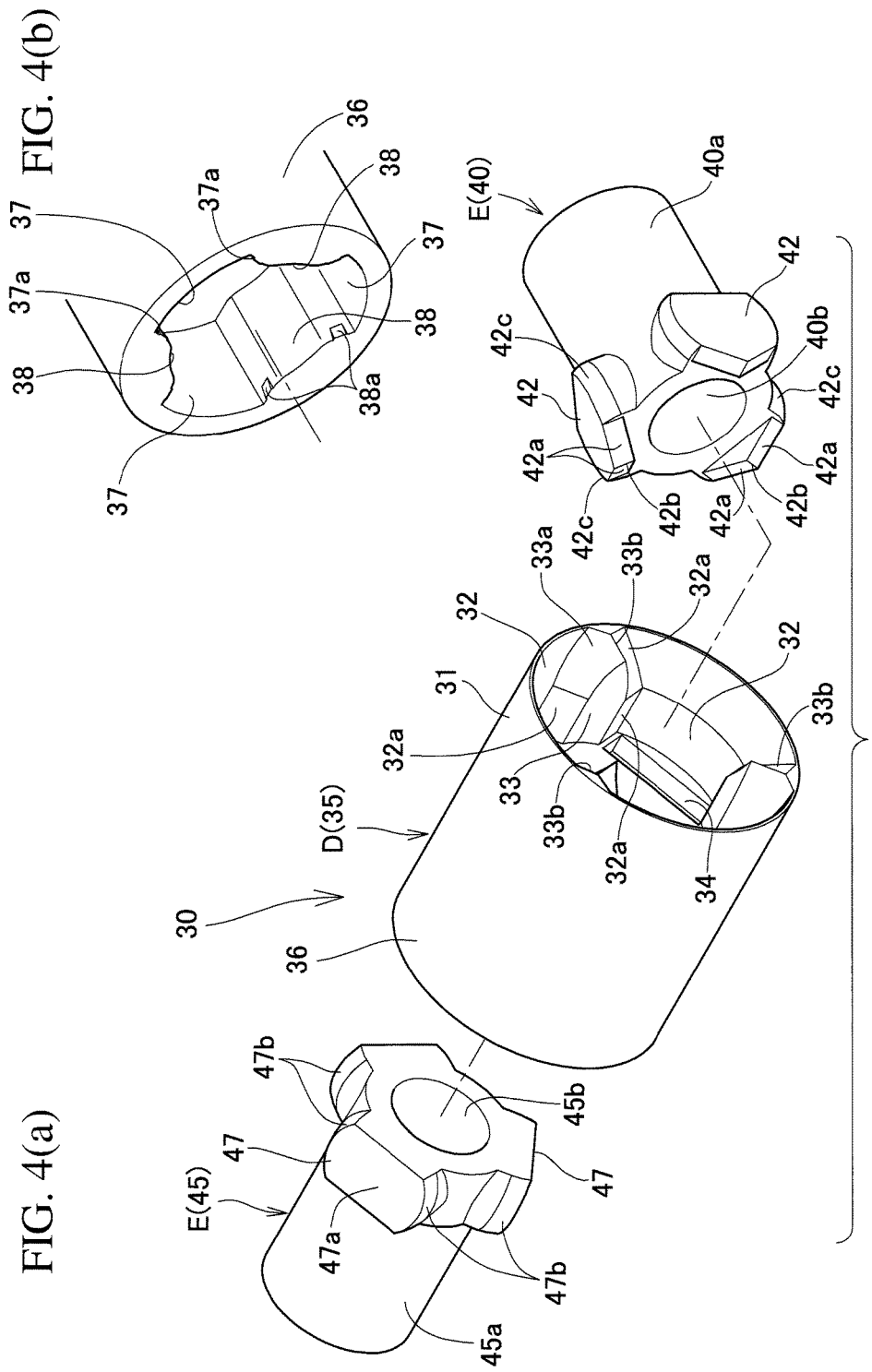

TRIPOD-TYPE CONSTANT VELOCITY JOINT

TECHNICAL FIELD

The present invention relates to a constant velocity joint through which a driving shaft and a driven shaft are coupled together such that the motive power of the driving shaft is transmitted to the driven shaft through the constant velocity joint.

BACKGROUND ART

Constant velocity joints have been known as components for transmitting the torque of a drive shaft of an automobile to an axle of the automobile.

Since constant velocity joints allow the angular displacement between a driving shaft and a driven shaft while keeping the speed of the driving and driven shafts constant, they are being used not only in automobiles but also in various industrial machines, home appliances, office machines, etc.

There are two types of constant-velocity joints, namely, fixed constant-velocity joints, which only permits an angular displacement, and sliding constant-velocity joints, which permit both angular and axial displacements. Japanese Unexamined Patent Application Publication No. 2007-255511 discloses a sliding constant-velocity joint.

The constant-velocity joint disclosed in JP 2007-255511 is called "tripod-type constant velocity joint", and includes an outer ring on the inner periphery thereof, the outer ring being formed with three axially extending track grooves which are circumferentially arranged at intervals of 120 degrees. A tripod member is mounted inside of the outer ring, and formed with three radial protrusions (leg shafts) slidably inserted in the respective track grooves, so that torque is transmitted between the outer ring and the tripod member.

The outer ring has bulges between the respective adjacent track grooves. Each of the bulges is formed at its distal end with a pair of tapered surfaces inclined in circumferentially opposite directions to each other so as to define an apex at the center of the bulge with respect to its circumferential width. Each of the protrusions is formed at its front portion with a pair of tapered surfaces inclined from the widthwise center of the protrusion toward both sides thereof so as to define an apex at the widthwise center of the protrusion, so that the tripod member can be easily inserted into and separated from the outer ring.

The tripod-type constant velocity joint disclosed in JP 2007-255511 is advantageous in that the tripod member can be easily inserted into and separated from the outer ring, no grease lubrication is necessary, it is lightweight and small in size, and it generates less noise.

Generally, in various kinds of devices in which a constant velocity joint is used, for maintenance or exchange of components due to their deterioration, in some cases, a driving shaft and a driven shaft are repeatedly connected to the joint (such that driving force is transmitted) and separated from the joint (such that driving force is not transmitted). Therefore, the tripod-type constant velocity joint of JP 2007-255511 is configured as described above, so that the tripod member can be easily inserted into and separated from the outer ring.

The constant-velocity joint of JP 2007-255511 allows the center axis of the driving shaft and the center axis of the driven shaft to be inclined relative to each other with a relatively large angle therebetween, provided that the two center axes intersect with each other in or near the joint.

However, this constant-velocity joint does not allow the above two center axes to be inclined relative to each other with a relatively large angle, if the above two center axes intersect with each other at a position remote from the joint. Also, this constant-velocity joint does not allow a large offset between the above two center axes if the center axes are parallel to each other.

In the tripod-type constant-velocity joint of JP 2007-255511, when the tripod member is inserted into the outer ring from its open side, even if the track grooves are circumferentially displaced from the respective protrusions, the protrusions are guided by the tapered surfaces formed at the distal ends of the bulges, while kept contact with the tapered surfaces, to the openings of the track grooves at their distal ends. This eliminates the necessity to align the track grooves with the respective protrusions, thus making the connection of the tripod-type constant velocity joint extremely easy.

However, the connection of the joint cannot be smoothly performed in rare cases. At this time, if this connection is forcibly performed, the apexes of the bulges and the apexes of the protrusions might be damaged.

After investigating the cause of such a problem, it turned out that when the connection of the joint is performed, the apexes of the bulges are completely aligned with the respective apexes of the protrusions, namely "three-point support" arises in a stable state, so that the tripod member is not guided by the tapered surfaces of the outer ring. Moreover, it turned out that if the tripod member is forcibly pushed into the outer ring in the above state, a pushing force larger than expected is applied thereto, so that the above apexes kept in contact with each other might be damaged.

SUMMARY OF THE INVENTION

It is a first object of the present invention to minimize a change in the rotational speed of the driving and driven shafts, and to allow a large inclination angle between the center axes of the driving and driven shafts as well as a large offset between these center axes.

It is a second object of the present invention to provide a tripod-type constant velocity joint in which "three-point support" do not arise between the apexes of bulges and the respective apexes of protrusions, so that a tripod member is smoothly guided by tapered surfaces of an outer ring, and the apexes of the bulges and the apexes of the protrusions are not damaged.

In order to achieve the above first object, the present invention provides a tripod-type constant velocity joint comprising a coupling member through which a driving shaft is coupled to a driven shaft. The coupling member is configured to transmit rotation of the driving shaft to the driven shaft while restraining a change in a rotational speed of the driven shaft when an angle between a center axis of the driving shaft and a center axis of the driven shaft is not 180 degrees, or when the center axis of the driving shaft and the center axis of the driven shaft are offset from each other. The coupling member comprises: an intermediate member; a first shaft end member connected to an end of the intermediate member on a side of the driven shaft; and a second shaft end member connected to an end of the intermediate member on a side of the driving shaft. The intermediate member comprises a first outer ring having a first axial end surface and a second outer ring having a second axial end surface. The first shaft end member comprises a first tripod member formed with three first protrusions, and the second shaft end member comprises a second tripod member formed with three second protrusions. The first outer ring is formed, in an inner periphery of the first outer ring, with axially extending first track grooves which are open at the first axial end surface of the first outer ring, and which are circumferentially arranged at intervals of 120 degrees, and the second outer ring is formed, in an inner periphery of the second outer ring, with axially extending second track grooves which are open at the second axial end surface of the second outer ring, and which are circumferentially arranged at intervals of 120 degrees. The first protrusions of the first tripod member are axially slidably received in the respective first track grooves of the first outer ring, and the second protrusions of the second tripod member are axially slidably received in the respective second track grooves of the second outer ring so that torque around a center axis can be transmitted between the second outer ring and the second tripod member and between the first outer ring and the first tripod member.

The tripod-type constant velocity joint, through which the driving and driven shafts are coupled together, is constituted by the intermediate member comprising the first and second outer rings having the first and second axial end surfaces, respectively, and each formed in the inner periphery thereof with the axially extending first or second track grooves which are open at the first or second axial end surface thereof, and which are circumferentially arranged at intervals of 120 degrees. The first and second shaft end members comprise, respectively, the first and second tripod members which are each formed with the three first or second protrusions axially slidably received in the respective first or second track grooves. The constant velocity joint is configured such that at two locations, specifically, at the respective ends of the intermediate member, the first and second shaft end members can be inclined and swiveled relative to the intermediate member. Therefore, even when the center axes of the driving shaft and the driven shaft are inclined relative to each other or offset from each other to a large degree, the driven shaft can rotate at a constant speed, that is, its rotational speed does not fluctuate.

In the tripod-type constant velocity joint, the first outer ring and the second outer ring may comprise two cups which are formed, in an inner surface of one of the two cups with the first track grooves, and, in an inner surface of the other of the two cups, with the second track grooves, and which are axially aligned with each other with bottoms of the respective cups abutting against each other.

The present invention also provides a tripod-type constant velocity joint comprising a coupling member through which a driving shaft is coupled to a driven shaft, and which is configured to transmit rotation of the driving shaft to the driven shaft, while restraining a change in a rotational speed of the driven shaft when an angle between a center axis of the driving shaft and a center axis of the driven shaft is not 180 degrees, or when the center axis of the driving shaft and the center axis of the driven shaft are offset from each other. The coupling member comprises: an intermediate member; a first shaft end member connected to an end of the intermediate member on a side of the driven shaft; and a second shaft end member connected to an end of the intermediate member on a side of the driving shaft. The intermediate member comprises a first outer ring arranged on one of two axial sides of the intermediate member, and a second tripod member arranged on the other of the two axial sides of the intermediate member. The first shaft end member comprises a first tripod member connected to the first outer ring, and the second shaft end member comprises a second outer ring connected to the second tripod member. The first outer ring has a first end on a side of the first tripod member, and the second outer ring has a second end on a side of the second tripod member. The first outer ring is formed, in an inner periphery of the first outer ring, with axially extending first track grooves which are open at the first end of the first outer ring, and which are circumferentially arranged at intervals of 120 degrees, and the second outer ring is formed, in an inner periphery of the second outer ring, with axially extending second track grooves which are open at the second end of the second outer ring, and which are circumferentially arranged at intervals of 120 degrees. The first tripod member is formed with three first protrusions, and the second tripod member is formed with three second protrusions. The first protrusions of the first tripod member are axially slidably received in the respective first track grooves of the first outer ring, and the second protrusions of the second tripod member are axially slidably received in the respective second track grooves of the second outer ring so that torque around a center axis can be transmitted between the second outer ring and the second tripod member and between the first outer ring and the first tripod member.

In the tripod-type constant velocity joint, the first and second tripod members and the first and second outer rings may be made of a synthetic resin composition or compositions. Preferably, a main component of the synthetic resin composition or compositions of which the first and second tripod members are made is different from a main component of the synthetic resin composition or compositions of which the first and second outer rings are made.

If the first and second tripod members and the first and second outer rings which form connecting portions are made of a synthetic resin composition or compositions, it is possible to dispense with a lubricant such as grease. Therefore, there is no need for a member such as a boot for preventing the leakage of a lubricant from the connecting portions. Also, it is possible to easily perform maintenance. Further, it is possible to prevent the phenomenon that peripheral devices are made dirty due to the leakage of a lubricant, and to reduce an operation sound which occurs when torque is transmitted. Also, if the main component of the synthetic resin composition or compositions of which the first and second tripod members are made is different from the main component of the synthetic resin composition or compositions of which the first and second outer rings are made, it is possible to prevent their adhesion phenomenon, and thus to make torque fluctuations and wear properties effective.

The tripod-type constant velocity joint may be configured such that one of the first and second tripod members is more easily axially separable from the corresponding one of the first and second outer rings than the other of the first and second tripod members is axially separable from the corresponding one of the first and second outer rings.

Generally, in various kinds of devices in which a constant velocity joint is used, for maintenance or exchange of components due to their deterioration, in some cases, a driving shaft and a driven shaft need to be connected to each other through the joint (such that driving force is transmitted) and separated from the joint (such that driving force is not transmitted). As described above, by making one of the two axial ends of the intermediate member more easily separable from the corresponding one of the first and second outer rings than the other of the two ends of the intermediate member is from the corresponding one of the first and second outer rings, it is possible to identify the separation portion between the driving shaft and the driven shaft. Namely, when the driving shaft and the driven shaft are pulled away from each other, the first or second protrusions are separated from the respective first or second track grooves, so that one axial end of the first or second tripod member is naturally separated from the corresponding one of the first and second outer rings. Also, when the driving shaft and the driven shaft are pushed so as to approach each other, the first or second protrusions are received into the respective first or second track grooves, so that one axial end of the first or second tripod member is naturally connected to the corresponding one of the first and second outer rings. Because the first or second protrusions are axially slidable in the respective first or second track grooves, such a motion is possible.

In order to make one of the two axial ends of the intermediate member more easily separable from the corresponding one of the first and second tripod members than the other of the two axial ends of the intermediate member is from the corresponding one of the first and second tripod members, for example, an anti-separation element such as a snap ring may be provided between the other of the two axial ends of the intermediate member (i.e., the fixed outer ring) and the corresponding one of the first and second tripod members (i.e., the fixed tripod member). As another type of anti-separation element, radially inwardly extending protrusions or undercuts may be formed at the open end portion of the fixed outer ring so as to narrow the opening/exit of the fixed outer ring. As still another type of anti-separation element, the constant velocity joint may be configured such that when the fixed tripod member is fitted in the fixed outer ring, a relatively narrow gap is defined between the fixed tripod member and the fixed outer ring so that the fixed tripod member is less likely to axially separate from the fixed outer ring, and may be configured such that when the unfixed tripod member is fitted in the unfixed outer ring, a relatively wide gap is defined between the unfixed tripod member and the unfixed outer ring so that when an axial pulling force is applied to the constant velocity joint, the unfixed tripod member is more easily separable from the unfixed outer ring than the fixed tripod member is from the fixed outer ring.

In order to enable the first protrusions of the first tripod member to be smoothly received in the respective first track grooves when one axial end of the first tripod member is connected to the first outer ring, the constant velocity joint may have a guiding function in the vicinity of the entrances of the first track grooves of the first outer ring.

Specifically, at a portion of the first outer ring to which the three first protrusions are connected, the first outer ring has bulges formed between the respective adjacent first track grooves, and each having a pair of tapered surfaces formed at a distal end of the bulge so as to be inclined in circumferentially opposite directions to each other, thereby defining an apex at a center of the bulge with respect to a circumferential width of the bulge. Each of the three first protrusions has a pair of tapered surfaces formed on a front side portion of the first protrusion so as to be inclined from a widthwise center of the first protrusion toward both sides of the first protrusion, thereby defining an apex at the widthwise center thereof.

With this arrangement, when the first tripod member (unfixed tripod member) is inserted from the open end side of the first outer ring (unfixed outer ring) such that the first tripod member and the first outer ring are connected to each other, even if the first protrusions are circumferentially displaced from the respective first track grooves, the first protrusions are guided along the tapered surfaces formed at the distal ends of the respective bulges while kept in contact with the tapered surfaces, and guided into the open distal ends of the respective first track grooves. Therefore, it is not necessary to align the first protrusions with the respective first track grooves, thus making it possible to connect the tripod-type constant velocity joint very easily.

In order to achieve the above second object, the tripod-type constant velocity joint may be configured such that the apex of at least one of the bulges of the first outer ring is axially displaced from the apexes of the other bulges. Especially, it is preferable that the apex of one of the bulges of the first outer ring is located forward of the apexes of the other bulges.

Alternatively, the tripod-type constant velocity joint may be configured such that the apex of at least one of the three first protrusions of the first tripod member is axially displaced from the apexes of the others of the three first protrusions. Especially, it is preferable that the apex of one of the three first protrusions is located forward of the apexes of the other first protrusions.

The arrangement is now supposed that the apexes of the bulges of the first outer ring are all at the same axial position, and the apexes of the first protrusions of the first tripod member are also all at the same axial position. In this arrangement, when the joint is assembled, if the apexes of the bulges are aligned with the respective apexes of the first protrusions, so-called "three-point support" arises at this time. Due to this "three-point support", the apexes of the first protrusions cannot be guided along the tapered surfaces, and also the apexes of the first protrusions and bulges might be damaged if a pushing force larger than expected is applied thereto. In order to avoid such "three-point support" between the apexes of the bulges and the respective apexes of the first protrusions, it is preferable that the constant velocity joint has the above-described structure.

Furthermore, the tripod-type constant velocity joint may be configured such that each of the first and second protrusions is formed, on both sides thereof, with side surfaces comprising curved surfaces curved along an axial direction, and opposed to, and in contact with, side surfaces of the corresponding track groove. The curved surfaces formed on both sides of each of the first and second protrusions come into contact with the side surfaces of the corresponding track groove, thereby enabling the first and second tripod members to be smoothly inclined and swiveled relative to the first and second outer rings, respectively, when the center axes of the driving shaft and the driven shaft are displaced or offset from each other.

In order to achieve the above first object, the present invention also provides a tripod-type constant velocity joint through which a driving shaft is coupled to a driven shaft, and which is configured to transmit rotation of the driving shaft to the driven shaft, while restraining a change in a rotational speed of the driven shaft when an angle between a center axis of the driving shaft and a center axis of the driven shaft is not 180 degrees, or when the center axis of the driving shaft and the center axis of the driven shaft are offset from each other. The constant velocity joint comprises: a pair of first and second outer rings connected to the driven shaft and the driving shaft, respectively; and a tripod member through which the first outer ring and the second outer ring are coupled together. The first outer ring is formed, in an inner periphery of the first outer ring, with axially extending three first track grooves which are circumferentially arranged at intervals of 120 degrees, and the second outer ring is formed, in an inner periphery of the second outer ring, with axially extending three second track grooves which are circumferentially arranged at intervals of 120 degrees. The tripod member is formed, at one of two axial ends of the tripod member, with three first protrusions, and, at the other of the two axial ends of the tripod member, with three second protrusions, and the first protrusions are axially slidably received in the respective first track grooves of the first outer ring, while the second protrusions are axially slidably received in the respective second track grooves of the second outer ring so that torque around a center axis can be transmitted between the first and second outer rings and the tripod member. The first protrusions are angularly displaced from the respective second protrusions around a center axis of the tripod member.

The tripod-type constant velocity joint, through which the driving and driven shafts are coupled together, is constituted by the first and second outer rings each formed with the three first/second track grooves, and the tripod member formed at the respective axial ends thereof with the three first protrusions and the three second protrusions received, respectively, in the first track grooves and in the second track grooves. The constant velocity joint is configured such that at two locations, specifically, at the respective ends of the tripod member, the first and second outer rings can be inclined and swiveled relative to the tripod member. Therefore, even when the center axes of the driving shaft and the driven shaft are inclined relative to each other or offset from each other to a large degree, the driven shaft can rotate at a constant speed, that is, its rotational speed does not fluctuate.

Since the three first protrusions at one axial end of the tripod member are angularly displaced from the respective second protrusions at the other axial end of the tripod member, even when the first protrusions at the one axial end of the tripod member are inserted deeply into the first outer ring, the second protrusions at the other axial end of the tripod member are not inserted into the first outer ring. This can prevent the tripod member from being inserted, more deeply than necessary, into the first outer ring. Therefore, in the state in which the respective ends of the tripod member are not inclined relative to the first and second outer rings, respectively (the state in which the tripod member is likely to be inserted deeply into the first/second outer ring), it is possible to freely set the respective maximum values of the axial lengths of the ends of the tripod member inserted in the first outer ring and the second outer ring, respectively. In this way, since either end of the tripod member is not inserted into the outer ring located on the opposite side of the corresponding outer ring, in which the end thereof is to be inserted, it is possible to minimize the length of the tripod member, and thus to make the constant velocity joint more small-sized. It is preferable that the first protrusions are angularly displaced from the respective second protrusions around the center axis of the tripod member at intervals of 60 degrees.

In this arrangement, too, the tripod member and the first and second outer rings may be made of a synthetic resin composition or compositions.

If the tripod member and the first and second outer rings are made of a synthetic resin composition or compositions, it is possible to dispense with a lubricant such as grease, and a member such as a boot for preventing the leakage of a lubricant. Also, it is possible to easily perform maintenance. Further, it is possible to prevent the phenomenon that peripheral devices are made dirty due to the leakage of a lubricant, and to reduce an operation sound which occurs when torque is transmitted. Also, if the main component of the synthetic resin composition or compositions of which the tripod member is made is different from the main component of the synthetic resin composition or compositions of which the first and second outer rings are made, it is possible to prevent their adhesion phenomenon, and thus to make torque fluctuations and wear properties effective.

The tripod-type constant velocity joint may be configured such that the first protrusions at one of the two axial ends of the tripod member are more easily separable axially from the first outer ring than the second protrusions at the other of the two axial ends thereof are from the second outer ring.

In order to make one of the two axial ends of the tripod member more easily separable from the corresponding one of the first and second outer rings than the other of the two axial ends of the tripod member is from the corresponding one of the first and second outer rings, as in the above, for example, an anti-separation element such as a snap ring may be provided between the other of the two axial ends of the tripod member (i.e., the fixed end) and the second outer ring (fixed outer ring). As another type of anti-separation element, radially inwardly extending protrusions or undercuts may be formed at the open end portion of the fixed outer ring so as to narrow the opening/exit of the fixed outer ring. As still another type of anti-separation element, the constant velocity joint may be configured such that when the fixed end of the tripod member is fitted in the fixed outer ring, a relatively narrow gap is defined between the fixed end and the fixed outer ring so that the tripod member is less likely to axially separate from the fixed outer ring, and configured such that when the one of the two axial ends of the tripod member (unfixed end) is fitted in the first outer ring (unfixed outer ring), a relatively wide gap is defined between the unfixed end and the unfixed outer ring so that when an axial pulling force is applied to the constant velocity joint, the tripod member is more easily separable from the unfixed outer ring than the tripod member is from the fixed outer ring.

In order to enable the first protrusions of the tripod member to be smoothly received in the respective first track grooves when the one axial end of the tripod member is connected to the first outer ring, the constant velocity joint may have a guiding function in the vicinity of the entrances of the first track grooves of the first outer ring.

Specifically, at a portion of the first outer ring to which the three first protrusions are connected, the first outer ring has bulges formed between the respective adjacent first track grooves, and each having a pair of tapered surfaces formed at a distal end of the bulge so as to be inclined in circumferentially opposite directions to each other, thereby defining an apex at a center of the bulge with respect to a circumferential width of the bulge. Each of the three first protrusions has a pair of tapered surfaces formed on a front side portion of the first protrusion so as to be inclined from a widthwise center of the first protrusion toward both sides of the first protrusion, thereby defining an apex at the widthwise center thereof.

With this arrangement, when the tripod member is inserted from the open end side of the first outer ring (unfixed outer ring) such that the tripod member and the first outer ring are connected to each other, even if the first protrusions are circumferentially displaced from the respective first track grooves, the first protrusions are guided along the tapered surfaces formed at the distal ends of the respective bulges while kept in contact with the tapered surfaces, and guided into the open distal ends of the respective first track grooves. Therefore, it is not necessary to align the first protrusions with the respective first track grooves, thus making it possible to connect the tripod-type constant velocity joint very easily.

In order to achieve the above second object, the tripod-type constant velocity joint may be configured such that the apex of at least one of the bulges of the first outer ring is axially displaced from the apexes of the others of the bulges. Especially, it is preferable that the apex of one of the bulges of the first outer ring is located forward of the apexes of the others of the bulges.

Alternatively, the tripod-type constant velocity joint may be configured such that the apex of at least one of the three first protrusions of the tripod member is axially displaced from the apexes of the others of the three first protrusions. Especially, it is preferable that the apex of one of the three first protrusions is located forward of the apexes of the others of the three first protrusions.

Furthermore, the tripod-type constant velocity joint may be configured such that each of the first and second protrusions is formed, on both sides thereof, with side surfaces comprising curved surfaces curved along an axial direction, and opposed to, and in contact with, side surfaces of the corresponding track groove. The curved surfaces formed on both sides of each of the first and second protrusions come into contact with the side surfaces of the corresponding track groove, thereby enabling the first and second outer rings to be smoothly inclined and swiveled relative to the tripod member, when the center axes of the driving shaft and the driven shaft are displaced or offset from each other.

In order to achieve the above second object, the present invention provides a tripod-type constant velocity joint comprising an outer ring, and a tripod member inserted inside of the outer ring. The outer ring is formed, in an inner periphery of the outer ring, with axially extending three track grooves which are circumferentially arranged at intervals of 120 degrees, and the tripod member is formed with three protrusions slidable in the respective track grooves, and enabling transmission of torque between the outer ring and the tripod member. The outer ring has bulges formed between the respective adjacent track grooves, and each of the bulges has a pair of tapered surfaces formed at a distal end of the bulge so as to be inclined in circumferentially opposite directions to each other, thereby defining an apex at a center of the bulge with respect to a circumferential width of the bulge. Each of the protrusions has a pair of tapered surfaces formed on a front side portion of the protrusion, which is to be first inserted into the outer ring when assembling the joint by inserting the tripod member into the outer ring from an open end of the outer ring, and the pairs of tapered surfaces of each of the protrusions are inclined from a widthwise center of the protrusion toward both sides of the protrusion so as to define an apex at the widthwise center thereof. The apex of at least one of the three bulges of the outer ring is axially displaced from the apexes of the others of the three bulges.

If the apex of at least one of the bulges of the outer ring is axially displaced from the apexes of the other bulges of the outer ring, it is possible to avoid "three-point support" between the apexes of the bulges and the respective apexes of the protrusions.

Especially, it is preferable that the apex of one of the bulges of the outer ring is located forward of the apexes of the other bulges.

The present invention also provides a tripod-type constant velocity joint comprising an outer ring, and a tripod member inserted inside of the outer ring. The outer ring is formed in an inner periphery of the outer ring with axially extending three track grooves which are circumferentially arranged at intervals of 120 degrees, and the tripod member is formed with three protrusions slidable in the respective track grooves, and enabling transmission of torque between the outer ring and the tripod member. The outer ring has bulges formed between the respective adjacent track grooves, and each of the bulges has a pair of tapered surfaces formed at a distal end of the bulge so as to be inclined in circumferentially opposite directions to each other, thereby defining an apex at a center of the bulge with respect to a circumferential width of the bulge. Each of the protrusions has a pair of tapered surfaces formed on a front side portion of the protrusion, which is to be first inserted into the outer ring when assembling the joint by inserting the tripod member into the outer ring from an open end of the outer ring, and the pairs of tapered surfaces of each of the protrusions are inclined from a widthwise center of the protrusion toward both sides of the protrusion so as to define an apex at the widthwise center thereof. The apex of at least one of the three protrusions of the tripod member is axially displaced from the apexes of the others of the three protrusions.

If the apex of at least one of the three protrusions of the tripod member is axially displaced from the apexes of the other protrusions of the tripod member, it is possible to avoid "three-point support" between the apexes of the bulges and the respective apexes of the protrusions.

Especially, it is preferable that the apex of one of the three protrusions of the tripod member is located forward of the apexes of the other bulges.

With this arrangement, when the outer ring and the tripod member are connected together, the three apexes of the outer ring do not simultaneously come into contact with the respective apexes of the tripod member, and the apexes of the outer ring and the apexes of the tripod member come into contact with each other in an unstable state, thus making it possible to prevent the "three-point support" between the apexes of the outer ring and the respective apexes of the tripod member.

Also, the tripod-type constant velocity joint may be configured such that tapered surfaces are formed at distal end portions of the bulges, and each of the tapered surfaces is inclined so as to enter an interior of the outer ring from an outer diameter side of the tapered surface toward an inner diameter side of the tapered surface. With this arrangement, when the joint is assembled by inserting the tripod member into the outer ring from the open end of the outer ring, even if the center axes of the outer ring and the tripod member are displaced from each other, the tapered surfaces of the protrusions are guided by the tapered surfaces formed at the distal ends of the bulges while kept in contact with the tapered surfaces of the bulges, so that the protrusion are guided into the open distal ends of the track grooves. Therefore, it is possible to easily connect the tripod-type constant velocity joint.

If at least one of the tripod member and the outer ring are made of a synthetic resin composition or compositions, it is possible to effectively reduce noise and increase silence in the tripod-type constant velocity joint. Also, if the main component of the synthetic resin composition or compositions of which the tripod member is made is different from the main component of the synthetic resin composition or compositions of which the outer ring is made, it is possible to prevent their adhesion phenomenon, and thus to make torque fluctuations and wear properties effective.

EFFECTS OF THE INVENTION

The tripod-type constant velocity joint of the present invention, through which the driving and driven shafts are coupled together, is constituted by the intermediate member comprising the first and second outer rings having the first and second axial end surfaces, respectively. Each of the first and second outer rings is formed in the inner periphery thereof with the axially extending first or second track grooves which are open at the first or second axial end surface thereof, and are circumferentially arranged at intervals of 120 degrees. The first and second shaft end members comprise, respectively, the first and second tripod members which are each formed with the three first or second protrusions axially slidably received in the respective first or second track grooves. The constant velocity joint is configured such that at two locations, specifically, at the respective ends of the intermediate member, the first and second shaft end members can be inclined and swiveled relative to the intermediate member. Therefore, even when the center axes of the driving shaft and the driven shaft are inclined relative to each other or offset from each other to a large degree, the driven shaft can rotate at a constant speed, that is, its rotational speed does not fluctuate.

The tripod-type constant velocity joint, through which the driving and driven shafts are coupled together, is constituted by the first and second outer rings each formed with the three first/second track grooves. The tripod member is formed at the respective axial ends thereof with the three first protrusions and the three second protrusions received, respectively, in the first track grooves and in the second track grooves. The constant velocity joint is configured such that at two locations, specifically, at the respective ends of the tripod member, the first and second outer rings can be inclined and swiveled relative to the tripod member. Therefore, even when the center axes of the driving shaft and the driven shaft are inclined relative to each other or offset from each other to a large degree, the driven shaft can rotate at a constant speed, that is, its rotational speed does not fluctuate.

Since angular displacements are set between the three protrusions at one axial end of the tripod member and the respective protrusions at the other axial end of the tripod member, when the protrusions at one axial end of the tripod member are inserted deeply into the corresponding outer ring, the protrusions at the other end of the tripod member are not inserted into this outer ring. Therefore, it is possible to minimize the length of the tripod member.

In the tripod-type constant velocity joint the present invention, since "three-point support" does not arise between the apexes of the tripod member and the apexes of the outer ring, the apexes of the protrusions are smoothly guided along the tapered surfaces of the bulges, and the apexes of the bulges and the apexes of the protrusions are not damaged.

BRIEF DESCRIPTION OF THE DRAWINGS

FIGS. 4(a) and 4(b) are exploded perspective views of the tripod-type constant velocity joint.

FIG. 5(a) is a sectional view of a varied coupling means, and FIG. 5(b) is an exploded perspective view of the varied coupling means.

FIG. 12(a) is a sectional view of a varied coupling means, and FIG. 12(b) is a perspective view of the tripod member of the varied means.

DETAILED DESCRIPTION OF THE INVENTION

First to fifth embodiments of the present invention are now described with reference to the drawings.

First Embodiment

Figure 1:
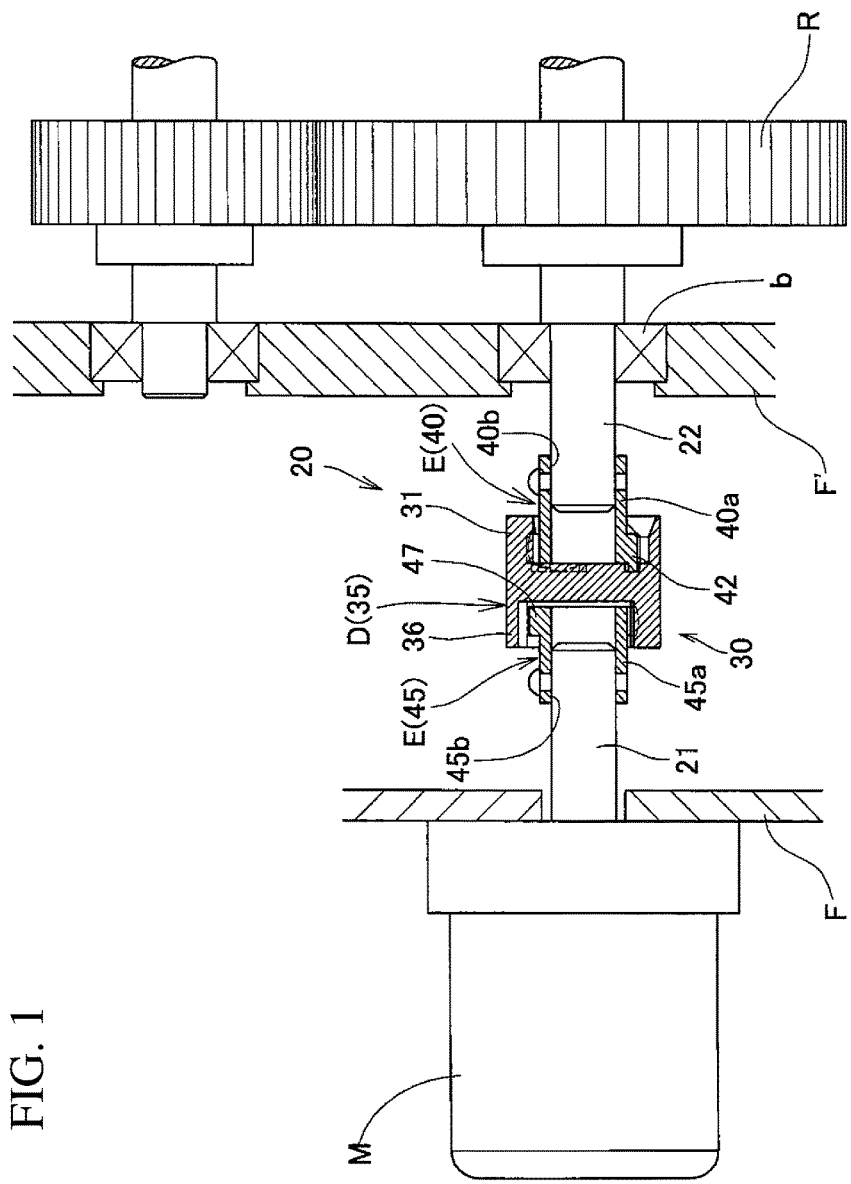
FIG. 1 is an enlarged view illustrating the main portion of a device in which a tripod-type constant velocity joint according to a first embodiment of the present invention is used.

FIG. 1 illustrates a portion of a rotation transmission mechanism in which a tripod-type constant velocity joint according to the first embodiment of the present invention is used. This rotation transmission mechanism includes a rotary portion R provided with gears through which driving force is transmitted, a driving source M comprising a motor configured to rotate the rotary portion R about the center axis of the rotary portion R, and a driving force transmitting device 20 through which driving force is transmitted from the driving source M to the rotary portion R.

Figure 5A:
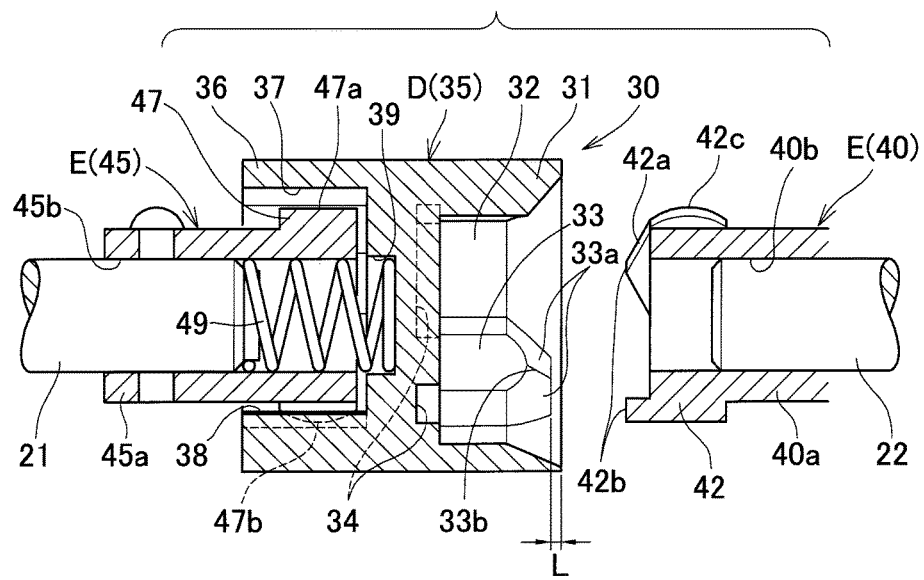
FIGS. 5(a) and 5(b) illustrate a variation of the tripod-type constant velocity joint. Specifically.
Figure 5B:
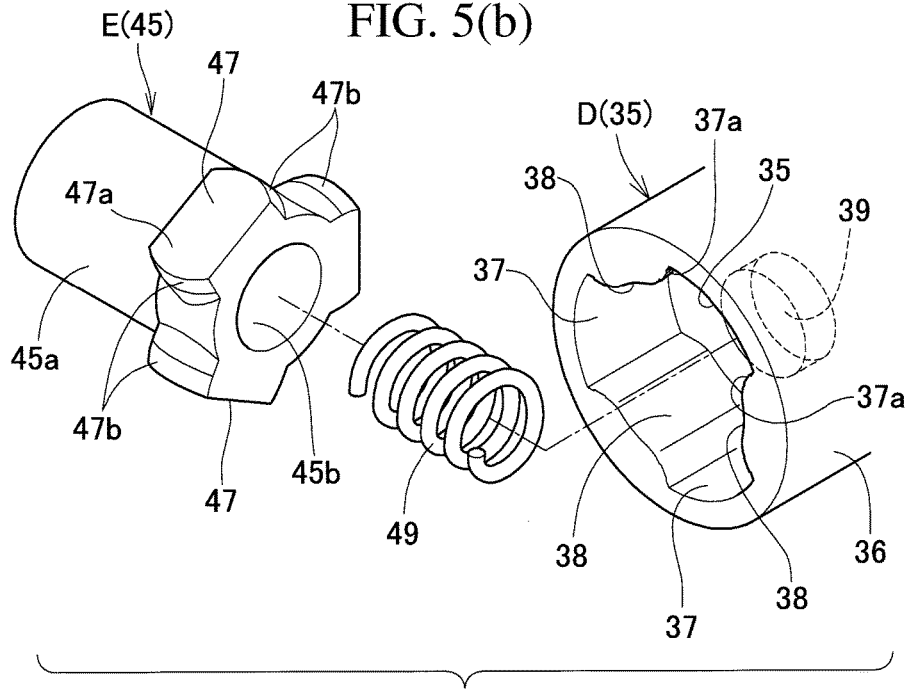

The driving force transmitting device 20 includes a coupling member comprising the tripod-type constant velocity joint of the first embodiment, through which a driving shaft 21 extending from the driving source M is coupled to a driven shaft 22 (hereinafter sometimes referred to as the "rotary member shaft 22") extending from the rotary portion R. The coupling member 30 functions to transmit the rotation of the driving shaft 21 to the rotary member shaft 22, while restraining changes in the rotational speed of the rotary member shaft 22 when the center axis of the rotary member shaft 22 is not aligned with the center axis of the driving shaft 21 (in other words, when the angle between the shafts 21 and 22 is not 180 degrees, or when the center axes of the shafts 21 and 22 are offset from each other). FIGS. 2(a) to 4(b) illustrate the coupling member 30 in detail. FIGS. 5(a) and 5(b) illustrate a variation of the coupling member 30.

As illustrated in FIG. 1, the rotary portion R rotates together with the rotary member shaft 22 and an additional rotary shaft member, and the rotary member shaft 22 and the additional rotary shaft member are supported, respectively, by a frame F' and an additional frame through a bearing b and an additional bearing so as to be rotatable about the center axis of the shafts 22. The driving source M for rotationally driving the rotary portion R is attached to a frame F on the side of the body of the rotation transmission mechanism so as to be axially opposed to the rotary portion R. The frame F' and the above-mentioned additional frame are movable, along the axial direction of the rotary member shaft 22, relative to the frame F such that the unit including the rotary portion R can be attached to and detached from the body of the rotation transmission mechanism.

The coupling member 30 is constituted by an intermediate member D (or 35), a first shaft end member E connected to the end of the intermediate member D on the side of the rotary member shaft 22, and a second shaft end member E connected to the end of the intermediate member D on the side of the driving shaft 21. The intermediate member D (35) includes a pair of outer rings 31 and 36 at the respective axial ends thereof. The first shaft end member E comprises a tripod member 40 inserted in the outer ring 31 to form a first connecting portion, and the second shaft end member E comprises a tripod member 45 inserted in the outer ring 36 to form a second connecting portion.

The outer rings 31 and 36 each have an axial end surface, and are each formed, in the inner periphery of the outer ring, with three axially extending track grooves 32 (37) which are open at one axial end surface of the outer ring 31 (36) and circumferentially arranged at intervals of 120 degrees. The tripod member 40 is formed with three protrusions 42 which are axially slidably received in the respective track grooves 32, while the tripod member 45 is formed with three protrusions 47 which are axially slidably received in the respective track grooves 37, so that torque around the center axes thereof can be transmitted between the outer ring 36 and the tripod member 45 and between the outer ring 31 and the tripod member 40.

The tripod member 40 includes a tubular body 40a in which an axial hole 40b is formed. The rotary member shaft 22 is inserted in the axial hole 40b of the tubular body 40a from the end side of the tripod member 40 opposite from the end side thereof on which the protrusions 42 are formed, so that the tripod member 40 and the rotary member shaft 22 are connected together. The tripod member 45 includes a tubular body 45a in which an axial hole 45b is formed. The driving shaft 21 is inserted into the axial hole 45b of the tubular body 45a from the end of the tripod member 45 opposite from the end thereof on which the protrusions 47 are formed, so that the tripod member 45 and the driving shaft 21 are connected together.

The first and second shaft end members E, which comprise the tripod members 40 and 45, and the intermediate member D (35), which includes the pair of outer rings 31 and 36, are all made of a synthetic resin composition or compositions, which comprise a base synthetic resin as the main component, and components other than the base synthetic resin, such as additives. As such a synthetic resin composition or compositions, a suitable one or ones, preferably a suitable one or ones enabling injection molding, are selected in accordance with the use conditions of this tripod-type constant velocity joint. Such a synthetic resin composition or compositions may be thermoplastic or thermosetting, if injection molding can be performed.

It is preferable to use a synthetic resin or resins as the main components of the synthetic resin compositions forming the pair of outer rings 31 and 36 that are different from the main components of the synthetic resin compositions forming the tripod members 40 and 45, respectively. With this arrangement, it is possible to prevent their adhesion phenomenon, and also prevent changes in torque and improve wear resistance. For example, the outer rings 31 and 36 may be made of nylon resin, and the tripod members 40 and 45 may be made of PPS resin (polyphenylene sulfide resin).

Figure 2A:
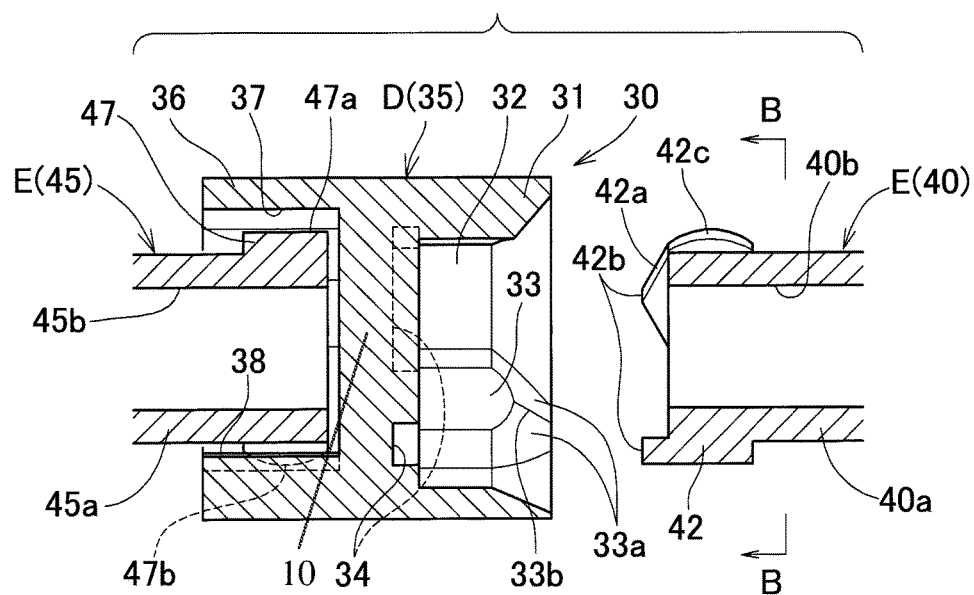
FIG. 2(a) is a longitudinal sectional view illustrating the details of components constituting the tripod-type constant velocity joint with a shaft end member on one side of the joint taken out of an intermediate member.
Figure 2B:
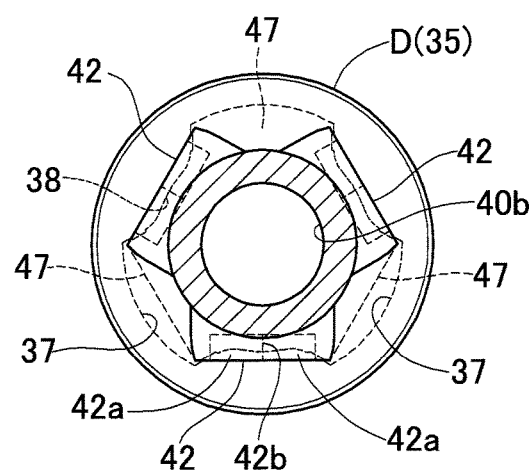
FIG. 2(b) is a view taken along line B-B of FIG. 2(a).

The intermediate member D comprises a cup-shaped member 35 constituted by two cups axially aligned with each other with the bottoms (formed by wall 10) of the respective cups abutting against each other. In other words, as shown in FIG. 2, the cup-shaped member 35 has a one-piece construction and is shaped as two axially-aligned cups with openings facing away from each other and their respective bottoms formed by wall 10. The outer rings 31 and 36 constitute the two cups, each formed in its inner surface with the track grooves 32 or 37. As described above, the outer rings 31 and 36 are each formed in its inner periphery with the three axially extending track grooves 32, 37, which are circumferentially arranged at intervals of 120 degrees. Each of the track grooves 32 and 37 has a circumferentially opposed pair of side surfaces 32a, 37a which are flat surfaces extending in parallel to each other.

The three protrusions 42 of the tripod member 40 are received in the respective track grooves 32 of the outer ring 31, while the three protrusions 47 of the tripod member 45 are received in the respective track grooves 37 of the outer ring 36. The distal ends of the protrusions 42 are received in receiving recesses 34 formed in the deepest portions of the respective track grooves 32 of the outer ring 31.

The protrusions 42 are axially slidable in the respective track grooves 32, and the protrusions 47 are axially slidable in the respective track grooves 37. Each protrusion 42 is formed on both sides thereof with side surfaces 42c opposed to the respective side surfaces 32a of the corresponding track groove 32, and each protrusion 47 is formed on both sides thereof with side surfaces 47b opposed to the respective side surfaces 37a of the corresponding track groove 37. The side surfaces 42c and 47b are cylindrical surfaces curved along the axial direction of the tripod members. In the first embodiment, the cylindrical side surfaces 42c, 47b of each protrusion 42, 47, which are opposite from each other, have a common center axis extending in the radial direction of the tripod member, and coinciding with the center axis of the protrusion 42, 47 in the protruding direction of the protrusion. The side surfaces 42c and 47b may, however, be replaced with spherical surfaces.

When torque is applied to one of the driving shaft 21 and the rotary member shaft 22, the side surfaces 42c on both sides of each protrusion 42, and the side surfaces 47b on both sides of each protrusion 47 engage, respectively, with the side surfaces 32a of the corresponding track groove 32 and with the side surfaces 37a of the corresponding track groove 37, so that torque around the center axes thereof is transmitted between the outer ring 36 and the tripod member 45 and between the outer ring 31 and the tripod member 40.

In this state, if the center axes of the driving shaft 21 and the rotary member shaft 22 are inclined relative to each other or offset from each other, the side surfaces 42c of the protrusions 42 slide on the side surfaces 32a of the track grooves 32 while being kept in contact with the side surfaces 32a, and the side surfaces 47b of the protrusions 47 slide on the side surfaces 37a of the track grooves 37 while being kept in contact with the side surfaces 37a. Therefore, the tripod members 40 and 45 can be smoothly inclined or swiveled relative to the outer rings 31 and 36, respectively.

The coupling member 30 is configured such that the tripod member 40, located on the side of the rotary portion R, is more easily separable axially from the portion of the outer ring 31 to which the protrusions 42 at an end of the tripod member 40 are connected than the tripod member 45, located on the side of the driving source M, is separable axially from the portion of the outer ring 36 to which the protrusions 47 at an end of the tripod member 45 are connected. In other words, the amount of force necessary to separate the tripod member 40 from the outer ring 31 is less than the amount of force necessary to separate the tripod member 45 from the outer ring 36.

Figure 3:
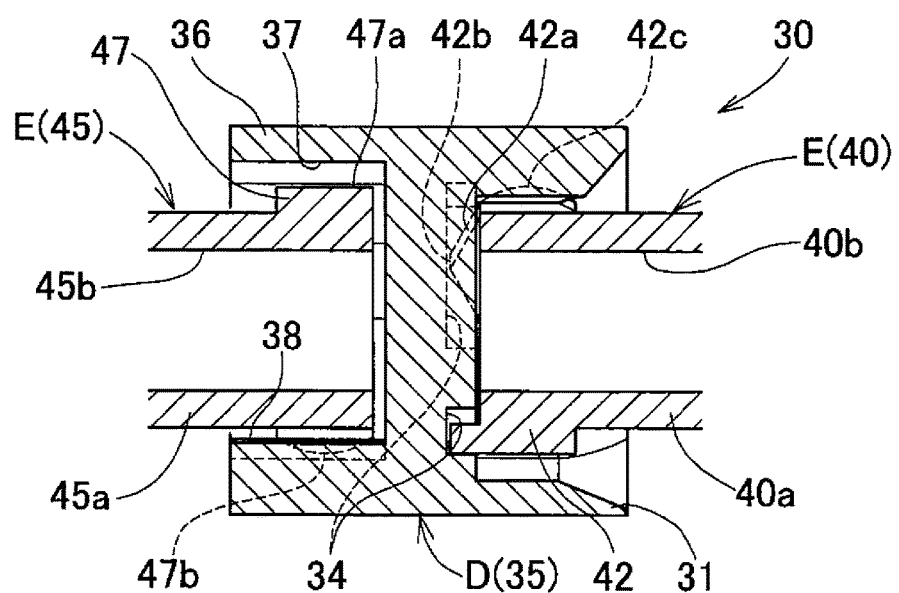
FIG. 3) is a longitudinal sectional view of the tripod-type constant velocity joint.

In the first embodiment, the coupling member 30 is configured such that the tripod member 45 on the side of the driving source M is less likely to axially separate from the portion of the outer ring 36 to which the tripod member 45 is connected, because when the tripod member 45 is fitted in the outer ring 36, a relatively narrow gap is defined between the tripod member 45 and the outer ring 36, so that the tripod member 45 is press-fitted in the outer ring 36 with a strong force so as to be fixed to the outer ring 36. The coupling member 30 is further configured such that when the tripod member 40 on the side of the rotary portion R is fitted in the outer ring 31, a relatively wide gap is defined between the tripod member 40 and the outer ring 31, so that the tripod member 40 is fitted in the outer ring 31 with a relatively weak force so as not to be fixed to the outer ring 31. With this arrangement, when an axial pulling force is applied to the coupling member 30, the unfixed tripod member 40 is more easily separable from the outer ring 31 than the fixed tripod member 45 is from the outer ring 36. In other words, as shown in FIG. 3, the clearance between the side surface 42c and side surface 32a on the side of rotary portion R is greater than the clearance between the side surface 47b and side surface 37a on the side of the driving source M. As a result of the larger clearance, the tripod member 40 is more easily separated from the outer ring 31 than is the tripod member 45 from the outer ring 36.

It is preferable, according to the present invention, that as in the first embodiment, the tripod member located on the side of the driving source M is fixed, and the tripod member located on the side of the rotary portion R is not fixed. However, the former may be unfixed, and the latter may be fixed.

As another way for making one of the tripod members 40 and 45 more easily separable from the corresponding outer ring than the other tripod member is from the corresponding outer ring, for example, an anti-separation means such as a snap ring may be provided between the fixed tripod member 45 and the outer ring 36. Specifically, a C-shaped snap ring having a circumferentially separated portion (or circumferentially opposed ends) may be fitted in an engagement groove formed in the inner periphery of the outer ring 36 at its open end portion. Such a snap ring prevents the tripod member 45 from separating from the open end of the outer ring 36. As still another way, radially inwardly extending protrusions or undercuts (see "38a" in FIG. 4) may be formed at the open end portions of the track grooves of the fixed outer ring 36 so as to narrow the opening/exit of the outer ring 36.

The unfixed outer ring 31 has bulges 33 formed between the respective adjacent track grooves 32. Each bulge 33 has a pair of tapered surfaces 33a formed at its distal end (end on the open side of the outer ring 31) so as to be inclined in circumferentially opposite directions to each other, and thus define an apex 33b at substantially the center of the bulge 33 with respect to its circumferential width. Each apex 33b is constituted by a straight ridgeline extending in the radial direction of the outer ring 31.

The fixed outer ring 36 also has bulges 38 formed between the respective adjacent track grooves 37. However, since the tripod member 45 is not frequently connected to and disconnected from the outer ring 36, the bulges 38 are not formed with tapered surfaces and apexes.

The three protrusions 42, formed at an end portion of the unfixed tripod member 40, are each formed on its front surface with a pair of tapered surfaces 42a inclined from the widthwise center of the protrusion 42 toward both sides of the protrusion 42 so as to define an apex 42b at substantially the widthwise center of the protrusion 42. Each apex 42b is constituted by a straight ridgeline extending in the radial direction of the tripod member 40. The front surfaces of the three protrusions 47, formed at an end portion of the fixed tripod member 45, are flat surfaces extending in the direction orthogonal to the axial direction of the tripod member 45. The protrusions 47 have respective apexes or top surfaces 47a facing radially outwardly, and the top surfaces 47a are also flat surfaces.

In this rotation transmission mechanism, if the body of the unit including the rotary portion R is not supported at a correct position, the center axis of the rotary member shaft 22 of the rotary portion R and the center axis of the driving shaft 21 of the driving source M are displaced from each other in the vertical or horizontal direction or both in the vertical and horizontal directions, namely the center axes of the shafts 21 and 22 are inclined relative to each other or offset from each other.

When torque is transmitted in such a state, at the portion of the unfixed outer ring 31 to which the tripod member 40 is connected, the protrusions 42 slide along the respective track grooves 32 in the axial direction of the outer ring 31, and at the portion of the fixed outer ring 36 to which the tripod member 45 is connected, the protrusions 47 slide along the respective track grooves 37 in the axial direction of the outer ring 36. At this time, since the side surfaces 42c of the protrusions 42 and the side surfaces 47b of the protrusions 47 are kept in line contact (or point contact if the side surfaces 42c and 47b are spherical surfaces), respectively, with the side surfaces 32a of the track grooves 32 and with the side surfaces 37a of the track grooves 37, the slide resistance is small, so that the protrusions 42 and 47 smoothly slide along the tack grooves 32 and 37.

In this way, the coupling means 30 is configured such that at two locations, specifically, at the respective ends of the intermediate member D, the first and second shaft end members E can be inclined and swiveled relative to the outer rings 31 and 36, respectively. Therefore, even when the center axes of the driving shaft 21 and the rotary member shaft 22 are inclined relative to each other or offset from each other to a large degree, the rotary portion R can rotate at a constant speed, that is, its rotational speed does not fluctuate.

FIGS. 5(a) and 5(b) illustrate a variation of the above coupling means 30. In the above-described embodiment, the apexes 33b of the three bulges 33 of the unfixed outer ring 31 are all at the same axial position (at the same position with respect to the axial direction of the outer ring 31), and the apexes 42b of the three protrusions 42 of the tripod member 40, which correspond to the apexes 33b, are also all at the same axial position (at the same position with respect to the axial direction of the tripod member 40).

When the outer ring 31 and the tripod member 40 are assembled together, each of the apexes 42b of the protrusions 42, which are circumferentially arranged at intervals of 120 degrees around the center axis of the tripod member 40, is first brought into abutment with one of the tapered surfaces 33a which define therebetween the apex 33b of the corresponding one of the bulges 33, which are similarly circumferentially arranged at intervals of 120 degrees, and is then guided along this tapered surface 33a into the corresponding track groove 32.

When the outer ring 31 and the tripod member 40 are assembled together, if the apexes 42b of the protrusions 42 are aligned with the respective apexes 33b of the bulges 33, the three apexes 42b are supported by the respective three apexes 33b, so that the apexes 42b cannot be guided along the tapered surfaces 33a, and also the apexes 33b and 42b, kept in abutment with each other, might be damaged if a pushing force larger than expected is applied thereto. In order to avoid such "three-point support" between the apexes 33b and the respective apexes 42b, the coupling means 30 may have one of the below-described first and second structures.

As the first structure, the apex 33b of at least one of the three bulges 33, formed on the outer ring 31, is set to be axially displaced from the apexes 33b of the other bulges 33. This can avoid the above "three-point support". As the first structure, one of the following three specific arrangements can be chosen: (1) arrangement in which two of the three apexes 33b are at the same axial position, and the other of the three apexes 33b is located axially forward of the two apexes 33b (located on the open end side of the outer ring 31); (2) arrangement in which two of the three apexes 33b are at the same axial position, and the other of the three apexes 33b is located axially rearward of the two apexes 33b (located on the closed end side of the outer ring 31); and (3) arrangement in which the axial positions of the three apexes 33b are all different from each other. In case the first structure is used, the apexes 42b of the three protrusions 42 of the tripod member 40 are arranged such that the three apexes 42b do not simultaneously abut against the respective apexes 33b of the bulges 33. This can be realized, for example, by arranging the three apexes 42b at the same axial position.

FIG. 5(a) illustrates the arrangement in which the apex 33b of one of the three bulges 33, formed on the outer ring 31, is located axially forward of the apexes 33b of the other two bulges 33 by a distance L, with the apexes 33b of the other two bulges 33 located at the same axial position. In this arrangement, the apexes 42b of the three protrusions 42 of the tripod member 40 are all set to be at the same axial position, so that it is possible to avoid the "three-point support" between the apexes 33b and the respective apexes 42b.

In FIG. 5(a), as a means for making one of the tripod members more easily separable from the corresponding axial end of the intermediate member D than the other tripod member is from the corresponding axial end of the intermediate member D, a single coil spring 49 is provided between the fixed tripod member 45 and the outer ring 36. Specifically, both ends of the single coil spring 49 are fitted, respectively, in the axial hole 45b, formed in the center of the tripod member 45, and in an axial hole 39 formed in the outer ring 36. The tripod member 45 and the outer ring 36 are supported by the coil spring 49 so as to be inseparable from each other. In this state, the tripod member 45 can be inclined and swiveled relative to the outer ring 36, and the tripod member 45 and the outer ring 36 do not separate from each other unless they are axially pulled with a relatively strong force. Therefore, as in the above embodiment, if the tripod members 40 and 45 are pulled away from each other in the axial direction, the tripod member 40 is separated from the outer ring 31, and the tripod member 45 is not separated from the outer ring 36.

As the second structure, the apex 42b of at least one of the three protrusions 42, formed on the tripod member 40, can be set to be axially displaced from the apexes 42b of the other protrusions 42. This can avoid the above "three-point support". As the second structure, one of the following three specific arrangements can be chosen: (1) arrangement in which two of the three apexes 42b are at the same axial position, and the other of the three apex 42b is located axially forward of the two apexes 42b (located on the side of the intermediate member D); (2) arrangement in which two of the three apexes 42b are at the same axial position, and the other of the three apexes 42b is located axially rearward of the two apexes 42b (located on the side of the rotary member shaft 22); and (3) arrangement in which the axial positions of the three apexes 42b are all different from each other. In case the second structure is used, the apexes 33b of the three bulges 33 of the outer ring 31 are arranged such that the three apexes 33b do not simultaneously do not abut against the respective apexes 42b of the protrusions 42. This can be realized, for example, by arranging the three apexes 33b at the same axial position.

Figure 6:
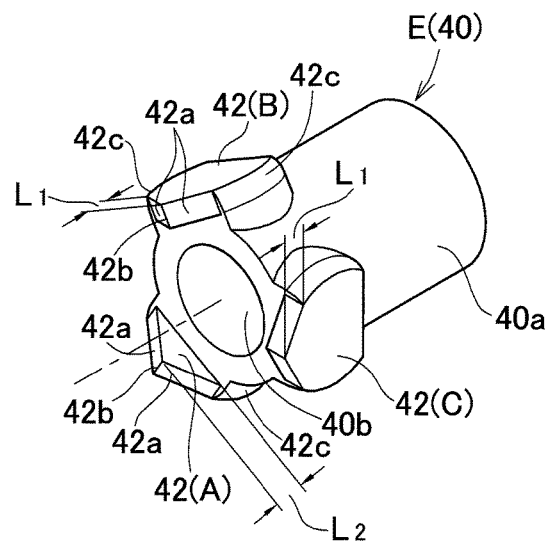
FIG. 6 is a perspective view illustrating a further variation of the tripod-type constant velocity joint.

FIG. 6 illustrates the arrangement in which the apex 42b of one (see "42(A)" in FIG. 6) of the three protrusions 42, formed at one end of the tripod member 40, is located axially forward of the apexes 42b of the other two protrusions 42 (see "42(B) and 42(C)" in FIG. 6), with the apexes 42b of the other two protrusions 42 located at the same axial position. In particular, as shown in FIG. 6, the apexes of 42(B) and 42(C) protrude axially outward a distance L1, whereas the apex of 42(A) protrudes axially outward a distance L2 which is greater than L1. In this arrangement, the apexes 33b of the three bulges 33 of the outer ring 31 are all set to be at the same axial position, so that it is possible to avoid the "three-point support" between the apexes 33b and the respective apexes 42b.

Second Embodiment

Figure 7:
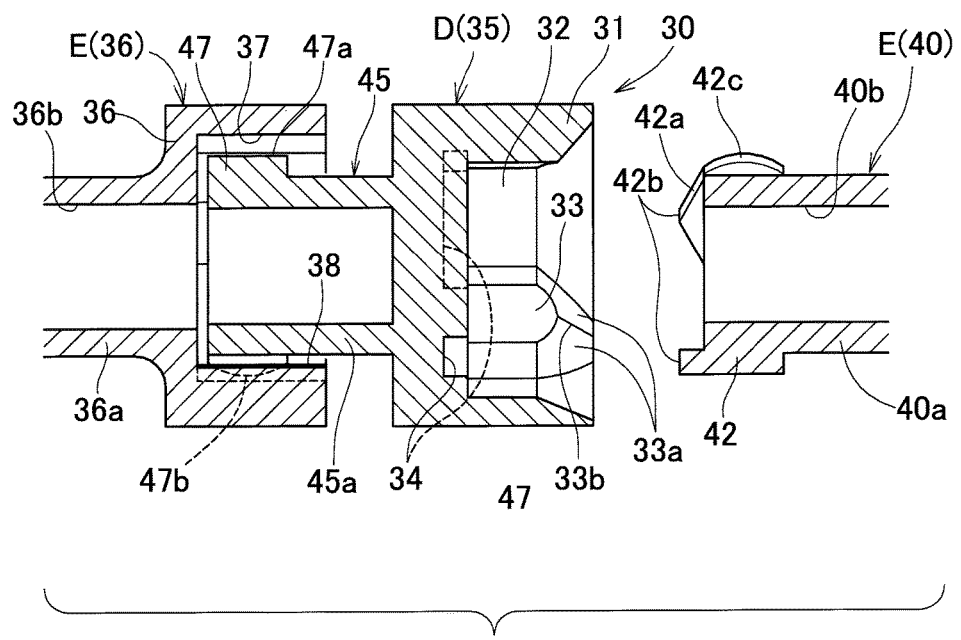
FIG. 7 is a longitudinal sectional view of a tripod-type constant velocity joint according to a second embodiment of the present invention with a shaft end member on one side of the joint taken out of an intermediate member.

FIG. 7 illustrates a coupling means 30 according to the second embodiment of the present invention. This coupling means 30 is constituted by an intermediate member D, a first shaft end member E connected to the end of the intermediate member D on the side of the rotary member shaft 22, and a second shaft end member E connected to the end of the intermediate member D on the side of the driving shaft 21. The intermediate member D comprises an outer ring 31 arranged on one axial side thereof, and a tripod member 45 arranged on the other axial side thereof. The first shaft end member E comprises a tripod member 40 connected to the outer ring 31, and the second shaft end member E comprises an outer ring 36 connected to the tripod member 45.

The connection structure between the tripod member 40 and the outer ring 31, which is located on one axial side of the intermediate member D, and the connection structure between the outer ring 36 and the tripod member 45, which is located on the other axial side of the intermediate member D, are identical to those of the first embodiment except that the axial arrangement/location of the outer ring 36 and the tripod member 45 is different from that of the outer ring 36 and the tripod member 45 of the first embodiment. Therefore, their description is omitted in the second embodiment.

The tripod member 40 is formed with three protrusions 42, and includes a tubular body 40a formed with an axial hole 40b. The rotary member shaft 22 is connected to the tripod member 40 by inserting the rotary member shaft 22 into the axial hole 40b of the tubular body 40a from the end of the tripod member 40 opposite from the end portion thereof on which the protrusions 42 are formed. The tripod member 45 is formed with three protrusions 47, and includes a tubular body 45a. The tubular body 45a is integrally connected at one of the two axial ends thereof to the outer ring 31 such that the tripod member 45 is integral with the outer ring 31. The outer ring 36 is formed with track grooves 37, and includes a tubular shaft portion 36a in which an axial hole 36b is formed. The driving shaft 21 is connected to the outer ring 36 by inserting the driving shaft 21 into the axial hole 36b of the shaft portion 36a from the end of the outer ring 36 opposite from the open ends of the track grooves 37. (The driving shaft 21 and the rotary member shaft 22 are not illustrated in FIG. 7.)

The second embodiment illustrated in FIG. 7 is similar to the first embodiment in that the tripod member located on the side of the rotary portion R, i.e., the tripod member 40, is more easily separable axially from the portion of the outer ring 31 to which the three protrusions 42 at the end of the tripod member 40 are connected than the tripod member located on the side of the driving source M, i.e., the tripod member 45, is axially separable from the portion of the outer ring 36 to which the three protrusions 47 at the end portion of the tripod member 45 is connected. The second embodiment is also similar to the first embodiment in that while it is preferable that the tripod member located on the side of the driving source M is fixed, and the tripod member located on the side of the rotary portion R is not fixed, the former may be unfixed, and the latter may be fixed. The materials forming the tripod members 40, 45 and the outer rings 31, 36 are also identical to those of the first embodiment.

In the first and second embodiments, the driving shaft 21 of the driving source M is connected to the rotary member shaft 22 of the rotary portion R, which includes gears, through the tripod-type constant velocity joint. However, the coupling means 30, namely the tripod-type constant velocity joint of the present invention, can be widely used in joint portions of various kinds of members and devices which need to allow angular displacement between a driving shaft and a driven shaft while keeping the speed of the driving and driven shafts constant, including industrial machines, home appliances, office machines, etc.

Third Embodiment

Figure 8:
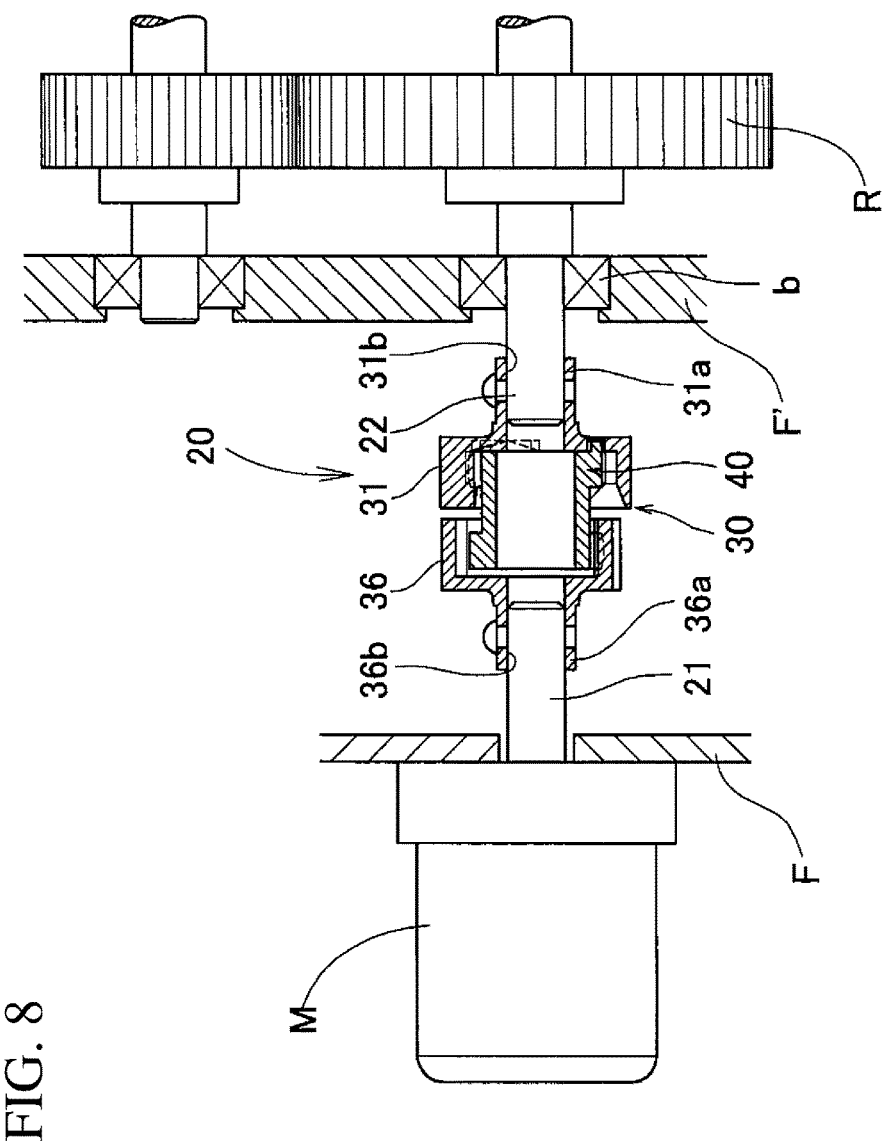
FIG. 8 is an enlarged view illustrating the main portion of a device in which a tripod-type constant velocity joint according to a third embodiment of the present invention is used.

FIG. 8 illustrates a portion of a rotation transmission mechanism in which a tripod-type constant velocity joint according to the third embodiment of the present invention is used. This rotation transmission mechanism includes a rotary portion R provided with gears through which driving force is transmitted, a driving source M comprising a motor configured to rotate the rotary portion R about the center axis of the rotary portion R, and a driving force transmitting device 20 through which driving force is transmitted from the driving source M to the rotary portion R.

Figure 12A:
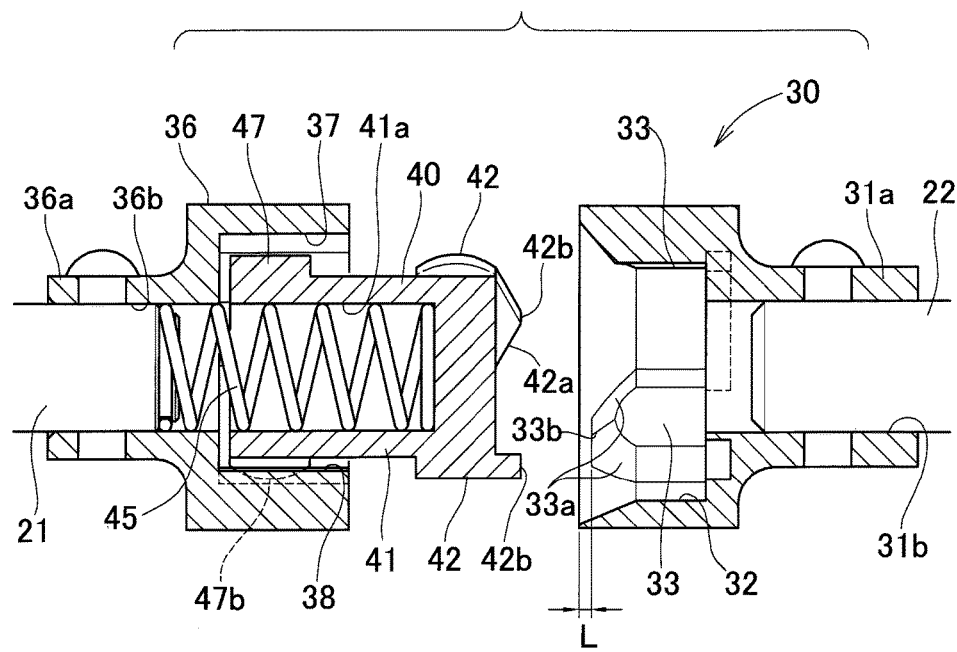
FIGS. 12(a) and 12(b) illustrate a variation of the tripod-type constant velocity joint. Specifically.

The driving force transmitting device 20 includes a coupling means 30 comprising the tripod-type constant velocity joint of the third embodiment, through which a driving shaft 21 extending from the driving source M is coupled to a driven shaft 22 (hereinafter sometimes referred to as the "rotary member shaft 22") extending from the rotary portion R. The coupling means 30 functions to transmit the rotation of the driving shaft 21 to the rotary member shaft 22, while restraining changes in the rotational speed of the rotary member shaft 22 when the center axis of the rotary member shaft 22 is not aligned with the center axis of the driving shaft 21, in other words, when the angle between the shafts 21 and 22 is not 180 degrees, or when the center axes of the shafts 21 and 22 are offset from each other. FIGS. 9 (a) to 11 illustrate the coupling means 30 in detail. FIGS. 12(a) and 12 (b) illustrate a variation of the coupling means 30.

As illustrated in FIG. 8, the rotary member shaft 22 and an additional rotary member shaft provided on the opposite side of the rotary portion R from the rotary member shaft 22 are supported, respectively, by a frame F' and an additional frame through a bearing b and an additional bearing so as to be rotatable about the center axis of the shaft 22. The driving source M for rotationally driving the rotary portion R is attached to a frame F on the side of the body of the rotation transmission mechanism so as to be axially opposed to the rotary portion R. The frame F' and the above-mentioned additional frame are movable, along the axial direction of the rotary member shafts 22, relative to the frame F such that the unit including the rotary portion R can be attached to and detached from the body of the rotation transmission mechanism.

The coupling means 30 couples the driving shaft 21 of the driving source M to the rotary member shaft 22 of the rotary portion R, and includes a pair of outer rings 31 and 36, and a tripod member 40 through which the outer rings 31 and 36 are coupled together. The tripod member 40 and the outer rings 31 and 36 are all made of a synthetic resin or resins. As such a synthetic resin or resins, a suitable one or ones, preferably a suitable one or ones enabling injection molding, are selected in accordance with the use conditions of this tripod-type constant velocity joint. Such a synthetic resin or resins may be thermoplastic or thermosetting, if injection molding can be performed.

Each of the outer rings 31 and 36 includes a cup-shaped portion having an open end and a closed end, and a shaft portion 31a, 36a provided at the closed end of the cup-shaped portion. The outer rings 31 and 36 are each formed in its inner periphery with axially extending three track grooves 32, 37 which are circumferentially arranged at intervals of 120 degrees. Each of the track grooves 32 and 37 has a circumferentially opposed pair of side surfaces 32a, 37a which are flat surfaces extending in parallel to each other.

The tripod member 40 includes a shaft-shaped body 41 formed at one axial end of the body 41 with three protrusions 42, and at the other axial end thereof with three protrusions 47. The three protrusions 42 are received in the respective track grooves 32 of the outer ring 31, and the three protrusions 47 are received in the respective track grooves 37 of the outer ring 36. The distal ends of the protrusions 42 are received in receiving recesses 34 formed in the deepest portions of the respective track grooves 32 of the outer ring 31.

The protrusions 42 are axially slidable in the respective track grooves 32, and the protrusions 47 are axially slidable in the respective track grooves 37. Each protrusion 42 is formed on both sides thereof with side surfaces 42c opposed to the respective side surfaces 32a of the corresponding track groove 32, and each protrusion 47 is formed on both sides thereof with side surfaces 47b opposed to the respective side surfaces 37a of the corresponding track groove 37. The side surfaces 42c and 47b are cylindrical surfaces curved along the axial direction of the tripod member 40. In the third embodiment, the center axis of the cylindrical surfaces formed on both sides of each protrusion extends in the radial direction of the tripod member 40, and coincides with the center axis of the protrusion in the protruding direction of the protrusion. However, the side surfaces 42c and 47b may be replaces with spherical surfaces.

The protrusions 42, provided at one axial end of the body 41 of the tripod member 40, are arranged such that center lines c of the protrusions 42 with respect to their respective circumferential widths (center lines extending through the respective apexes 42b) are angularly spaced apart from each other at equal intervals of 120 degrees around the center axis of the tripod member 40. The protrusions 47, provided at the other axial end of the body 41 of the tripod member 40, are arranged such that center lines d of the protrusions 47 with respect to their respective circumferential widths (center lines extending to pass through the centers of apexes or top surfaces 47a of the respective protrusions 47) are angularly spaced apart from each other at equal intervals of 120 degrees around the center axis of the tripod member 40. Also, the three protrusions 42 at the one axial end of the tripod member 40 are arranged to be out of alignment with and thus angularly displaced from the respective protrusions 47 at the other axial end of the tripod member 40 around the center axis of the tripod member 40.

Figure 9A:
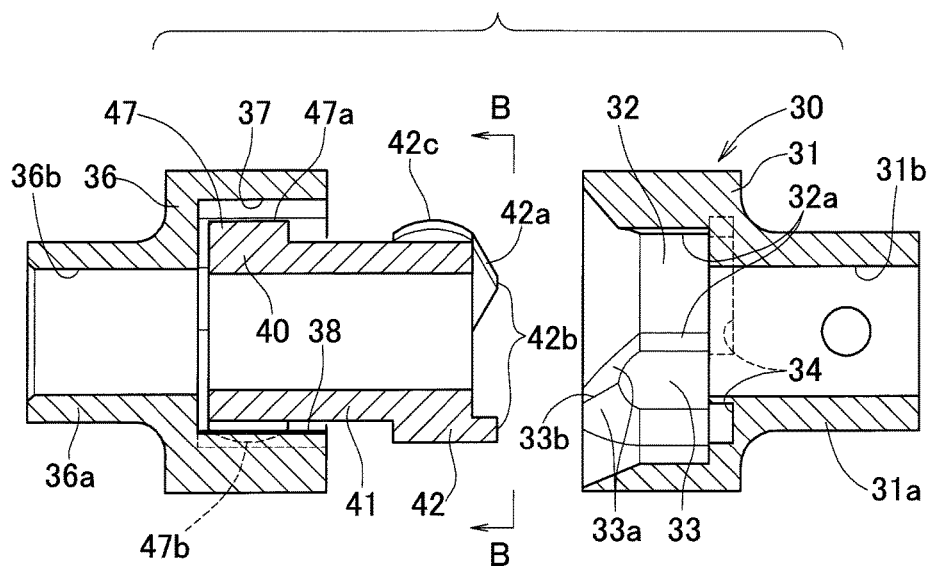
FIG. 9(a) is a sectional view of a pair of outer rings, the view illustrating the details of components constituting the tripod-type constant velocity joint.
Figure 9B:
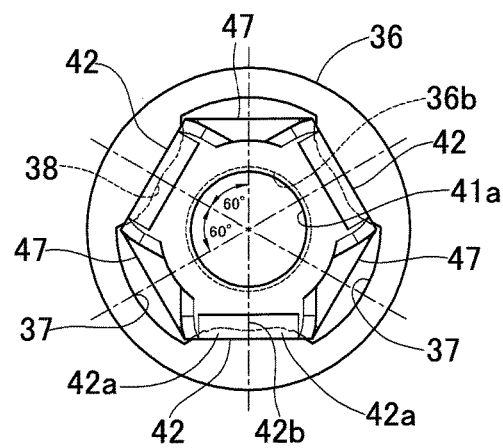
FIG. 9(b) is a view taken along line B-B of FIG. 9(a).
Figure 10:
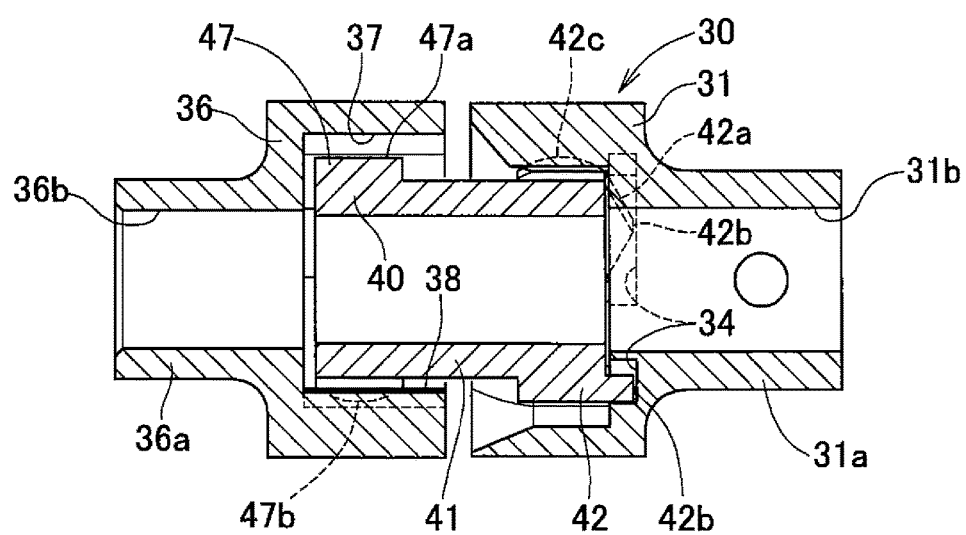
FIG. 10 is a sectional view of the tripod-type constant velocity joint.
Figure 11:
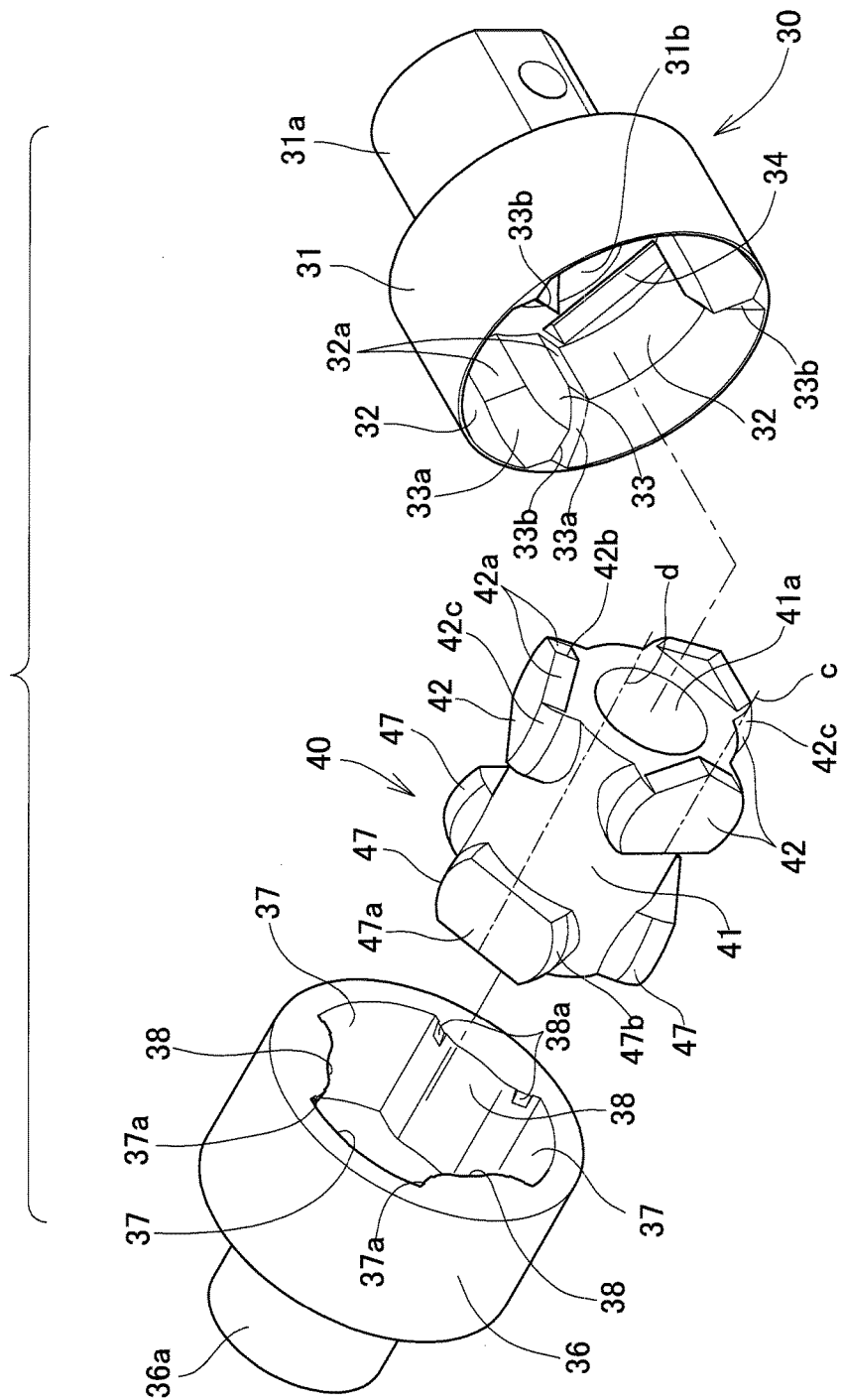
FIG. 11 is an exploded perspective view of the tripod-type constant velocity joint.

In the third embodiment, as illustrated in FIGS. 9(a), 9(b) and 11, the three protrusions 42 at one axial end of the tripod member 40 are displaced from the respective protrusions 47 at the other axial end of the tripod member 40 such that the center lines c of the protrusions 42 circumferentially alternate with the center lines d of the protrusions 47 at angular intervals of 60 degrees. Since the protrusions 42 are displaced from the respective protrusions 47 at intervals of 60 degrees around the center axis of the tripod member 40, there is the advantage that a force can be applied in a balanced manner to the body 41, which has such protrusions 42 and 47. The center lines c may circumferentially alternate with the center lines d at angular intervals other than 60 degrees.

Since the protrusions 42 at the one axial end of the tripod member 40 are angularly displaced from the respective protrusions 47 at the other axial end of the tripod member 40, even when the protrusions 42 are inserted deeply into the outer ring 31, the protrusions 47 are not inserted into the outer ring 31. This can prevent the tripod member 40 from being inserted, more deeply than necessary, into the outer ring 31. Namely, if the tripod member 40 is not configured as described above, when the outer rings 31 and 36 are not inclined relative to the tripod member 40 so as to be coaxial with the tripod member 40, the tripod member 40 could be inserted excessively deeply into either of the outer rings 31 and 36. However, if the tripod member 40 is configured as described above, it is possible to freely set the respective maximum values of the axial lengths of the ends of the tripod member 40 inserted, respectively, in the outer ring 31 and in the outer ring 36. In this way, since either end of the tripod member 40 will never be inserted into the outer ring located on the opposite side of the corresponding outer ring in which the end thereof is to be inserted, it is possible to minimize the length of the tripod member 40, and thus to make the constant velocity joint more small-sized.

If the protrusions 42 at the one axial end of the tripod member 40 were arranged to be aligned with the respective protrusions 47 at the other axial end thereof around the center axis of the tripod member 40, the tripod member 40 would have no stopper function, so that the tripod member 40 would need a length which is at least 1.5 times or over as large as the axial length of the track groove 32 or 37. In contrast thereto, since angular displacements are set between the protrusions 42 and the respective protrusions 47 in the third embodiment as described above, when either the protrusions 42 or the protrusions 47 enter the track grooves of the corresponding outer ring and then the tripod member 40 is inserted further deeply into this corresponding outer ring, the other protrusions cannot be inserted into these track grooves. Since the tripod member 40 has such a stopper function, it is possible to minimize the length of the tripod member 40.

In this way, the three protrusions 42 are received in the respective track grooves 32 of the outer ring 31, and the three protrusions 47 are received in the respective track grooves 37 of the outer ring 36. At this time, the distal ends of the protrusions 42 are received in the receiving recesses 34, formed in the deepest portions of the respective track grooves 32 of the outer ring 31.

When torque is input to one of the driving shaft 21 and the rotary member shaft 22, the side surfaces 42c on both sides of each protrusion 42, and the side surfaces 47b on both sides of each protrusion 47 engage, respectively, with the side surfaces 32a of the corresponding track groove 32 and with the side surfaces 37a of the corresponding track groove 37, so that torque around the center axes thereof is transmitted between the outer rings 31, 36 and the tripod member 40.

In this state, when the center axes of the driving shaft 21 and the rotary member shaft 22 are inclined relative to each other or offset from each other, the side surfaces 42c of the protrusions 42 slide on the side surfaces 32a of the track grooves 32 while kept in contact with the side surfaces 32a, and the side surfaces 47b of the protrusions 47 slide on the side surfaces 37a of the track grooves 37 while kept in contact with the side surfaces 37a, so that the outer rings 31 and 36 can be smoothly inclined or swiveled relative to the tripod member 40.

The coupling means 30 is configured such that the outer ring 31, on the side of the rotary portion R, is more easily separable axially from the portion of the tripod member 40 to which the outer ring 31 is connected (i.e., from the three protrusions 42 at the one axial end of the tripod member 40) than the outer ring 36, located on the side of the driving source M, is axially separable from the portion of the tripod member 40 to which the outer ring 36 is connected (i.e., from the three protrusions 47 at the other axial end of the tripod member 40).

In the third embodiment, the coupling means 30 is configured such that the outer ring 36 on the side of the driving source M is less likely to axially separate from the portion of the tripod member 40 to which the outer ring 36 is connected. Specifically, the coupling means 30 is configured such that when the outer ring 36 is fitted in the tripod member 40, a relatively narrow gap is defined between the tripod member 40 and the outer ring 36, so that the outer ring 36 is press-fitted in the tripod member 40 with a strong force so as to be fixed to the tripod member 40; and such that when the outer ring 31 on the side of the rotary portion R is fitted in the tripod member 40, a relatively wide gap is defined between the tripod member 40 and the outer ring 31, so that the outer ring 36 is fitted in the tripod member 40 with a relatively weak force so as not to be fixed to the tripod member 40. With this arrangement, when an axial pulling force is applied to the coupling means 30, the unfixed outer ring 31 is more easily separable from the tripod member 40 than the fixed outer ring 36 is from the tripod member 40.

It is preferable that as in the third embodiment, the outer ring located on the side of the driving source M is fixed, and the outer ring located on the side of the rotary portion R is not fixed. However, the former may be unfixed, and the latter may be fixed.

As another means for making one of the outer rings 31 and 36 more easily separable from the tripod member 40 than the other outer ring is from the tripod member 40, for example, an anti-separation means such as a snap ring may be provided between the tripod member 40 and the fixed outer ring 36. Specifically, a C-shaped snap ring having a circumferentially separated portion (or circumferentially opposed ends) may be fitted in an engagement groove formed in the inner periphery of the outer ring 36 at its open end portion. Such a snap ring prevents the tripod member 40 from separating from the open end of the outer ring 36. As still another means, radially inwardly extending protrusions or undercuts (see "38a" in FIG. 11) may be formed at the open end portions of the track grooves of the fixed outer ring 36 so as to narrow the opening/exit of the outer ring 36.

The unfixed outer ring 31 has bulges 33 formed between the respective adjacent track grooves 32. Each bulge 33 has a pair of tapered surfaces 33a formed at its distal end (end on the open side of the outer ring 31) so as to be inclined in circumferentially opposite directions to each other, and thus define an apex 33b at substantially the center of the bulge 33 with respect to its circumferential width. Each apex 33b is constituted by a straight ridgeline extending in the radial direction of the outer ring 31.

The fixed outer ring 36 has also bulges 38 formed between the respective adjacent track grooves 37. However, since the outer ring 36 is not frequently connected to and separated from the tripod member 40, the bulges 38 are not formed with tapered surfaces and apexes.

The three protrusions 42, formed at the end of the tripod member 40 on its unfixed side, are each formed on its front surface with a pair of tapered surfaces 42a inclined from the widthwise center of the protrusion 42 toward both sides of the protrusion 42 so as to define an apex 42b at substantially the widthwise center of the protrusion 42. Each apex 42b is constituted by a straight ridgeline extending in the radial direction of the tripod member 40.

In this rotation transmission mechanism, if the body of the unit including the rotary portion R is not supported at a correct position, the center axis of the rotary member shaft 22 of the rotary portion R and the center axis of the driving shaft 21 of the driving source M are displaced from each other in the vertical or horizontal direction or both in the vertical and horizontal directions, namely the center axes of the shafts 21 and 22 are inclined relative to each other or offset from each other.

When torque is transmitted in such a state, at the portion of the tripod member 40 connected to the unfixed outer ring 31, the protrusions 42 slide along the respective track grooves 32 in the axial direction of the outer ring 31, and at the portion of the tripod member 40 connected to the fixed outer ring 36, the protrusions 47 slide along the respective track grooves 37 in the axial direction of the outer ring 36.

At this time, since the side surfaces 42c of the protrusions 42 and the side surfaces 47b of the protrusions 47 are kept in line contact (or point contact if the side surfaces 42c and 47b are spherical surfaces), respectively, with the side surfaces 32a of the track grooves 32 and with the side surfaces 37a of the track grooves 37, the slide resistance is small, so that the protrusions 42 and 47 smoothly slide along the tack grooves 32 and 37.

In this way, the coupling means 30 is configured such that at two locations, specifically, at the respective ends of the tripod member 40, the outer rings 31 and 36 can be inclined and swiveled relative to the tripod member 40. Therefore, even when the center axes of the driving shaft 21 and the rotary member shaft 22 are inclined relative to each other or offset from each other to a large degree, the rotary portion R can rotate at a constant speed, that is, its rotational speed does not fluctuate.

Figure 12B:
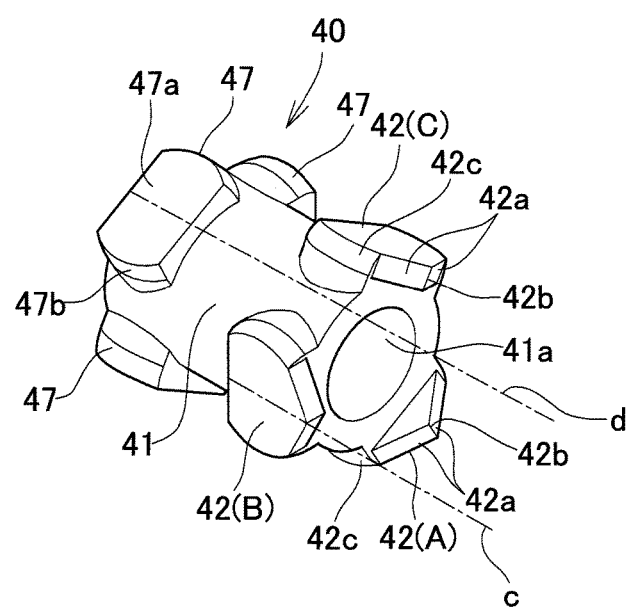

FIGS. 12(a) and 12(b) illustrate a variation of the above coupling means 30. In the above-described embodiment, the apexes 33b of the three bulges 33 of the unfixed outer ring 31 are all at the same axial position (at the same position with respect to the axial direction of the outer ring 31), and the apexes 42b of the three protrusions 42 of the tripod member 40, which correspond to the three apexes 33b, are also all at the same axial position (at the same position with respect to the axial direction of the tripod member 40).

When the outer ring 31 and the tripod member 40 are assembled together, each of the apexes 42b of the protrusions 42, which are circumferentially arranged at intervals of 120 degrees around the center axis of the tripod member 40, is first brought into abutment with one of the tapered surfaces 33a, which define therebetween the apex 33b of the corresponding one of the bulges 33, which are similarly circumferentially arranged at intervals of 120 degrees, and is then guided along this tapered surface 33a into the corresponding track groove 32.

When the outer ring 31 and the tripod member 40 are assembled together, if the apexes 42b of the protrusions 42 are aligned with the respective apexes 33b of the bulges 33, the three apexes 42b are supported by the respective three apexes 33b, so that the apexes 42b cannot be guided along the tapered surfaces 33a, and also the apexes 33b and 42b kept in abutment with each other might be damaged if a pushing force larger than expected is applied thereto. In order to avoid such "three-point support" between the apexes 33b and the respective apexes 42b, the coupling means 30 may have one of the below-described first and second structures.

As the first structure, the apex 33b of at least one of the three bulges 33, formed on the outer ring 31, is set to be axially displaced from the apexes 33b of the other bulges 33. This can avoid the above "three-point support". As the first structure, one of the following three specific arrangements can be chosen: (1) arrangement in which two of the three apexes 33b are at the same axial position, and the other of the three apexes 33b is located axially forward of the two apexes 33b (located on the open end side of the outer ring 31); (2) arrangement in which two of the three apexes 33b are at the same axial position, and the other of the three apexes 33b is located axially rearward of the two apexes 33b (located on the closed end side of the outer ring 31); and (3) arrangement in which the axial positions of the three apexes 33b are all different from each other. In case the first structure is used, the apexes 42b of the three protrusions 42 of the tripod member 40 are arranged such that the three apexes 42b do not simultaneously abut against the respective apexes 33b of the bulges 33. This can be realized, for example, by arranging the three apexes 42b at the same axial position.

FIG. 12(a) illustrates the arrangement in which the apex 33b of one of the three bulges 33, formed on the outer ring 31, is located axially forward of the apexes 33b of the other two bulges 33 by a distance L, with the apexes 33b of the other two bulges 33 located at the same axial position. In this arrangement, the apexes 42b of the three protrusions 42 of the tripod member 40 are all set to be at the same axial position, so that it is possible to avoid the "three-point support" between the apexes 33b and the respective apexes 42b.

In FIG. 12(a), as a means for making one of the outer rings more easily separable from the corresponding axial end of the tripod member 40 than the other outer ring is from the corresponding axial end of the tripod member 40, a single coil spring 45 is provided between the tripod member 40 and the fixed outer ring 36. Specifically, both ends of the single coil spring 45 are fitted, respectively, in an axial hole 41a formed in the center of the tripod member 40, and in an axial hole 36b formed in the outer ring 36. The tripod member 40 and the outer ring 36 are supported by the coil spring 45 so as to be inseparable from each other. In this state, the outer ring 36 can be inclined and swiveled relative to the tripod member 40, and the tripod member 40 and the outer ring 36 do not separate from each other unless they are axially pulled with a relatively strong force. Therefore, as in the above embodiment, if the outer rings 31 and 36 are pulled away from each other in the axial directions, the outer ring 31 is separated from the tripod member 40, and the outer ring 36 is not separated from the tripod member 40.

As the second structure, the apex 42b of at least one of the three protrusions 42, formed on the tripod member 40, can be set to be axially displaced from the apexes 42b of the other protrusions 42. This can avoid the above "three-point support". As the second structure, one of the following three specific arrangements can be chosen: (1) arrangement in which two of the three apexes 42b are at the same axial position, and the other of the three apex 42b is located axially forward of the two apexes 42b; (2) arrangement in which two of the three apexes 42b are at the same axial position, and the other of the three apexes 42b is located axially rearward of the two apexes 42b; and (3) arrangement in which the axial positions of the three apexes 42b are all different from each other. In case the second structure is used, the apexes 33b of the three bulges 33 of the outer ring 31 are arranged such that the three apexes 33b do not simultaneously abut against the respective apexes 42b of the protrusions 42. This can be realized, for example, by arranging the three apexes 33b at the same axial position.

FIG. 12(b) illustrates the arrangement in which the apex 42b of one ("42(A)" in FIG. 12(b)) of the three protrusions 42, formed at one end of the tripod member 40, is located axially forward of the apexes 42b of the other two protrusions 42 ("42(B) and 42(C)" in FIG. 12(b)), with the apexes 42b of the other two protrusions 42 located at the same axial position. In this arrangement, the apexes 33b of the three bulges 33 of the outer ring 31 are all set to be at the same axial position, so that it is possible to avoid the "three-point support" between the apexes 33b and the respective apexes 42b.

In the third embodiment, the driving shaft 21 of the driving source M is connected to the rotary member shaft 22 of the rotary portion R, which includes gears, through the tripod-type constant velocity joint 30. However, the coupling means 30, namely the tripod-type constant velocity joint of the present invention, can be widely used in joint portions of various kinds of members and devices which need to allow the angular displacement between a driving shaft and a driven shaft while keeping the speed of the driving and driven shafts constant, including industrial machines, home appliances, office machines, etc.

Fourth Embodiment

Figure 13:
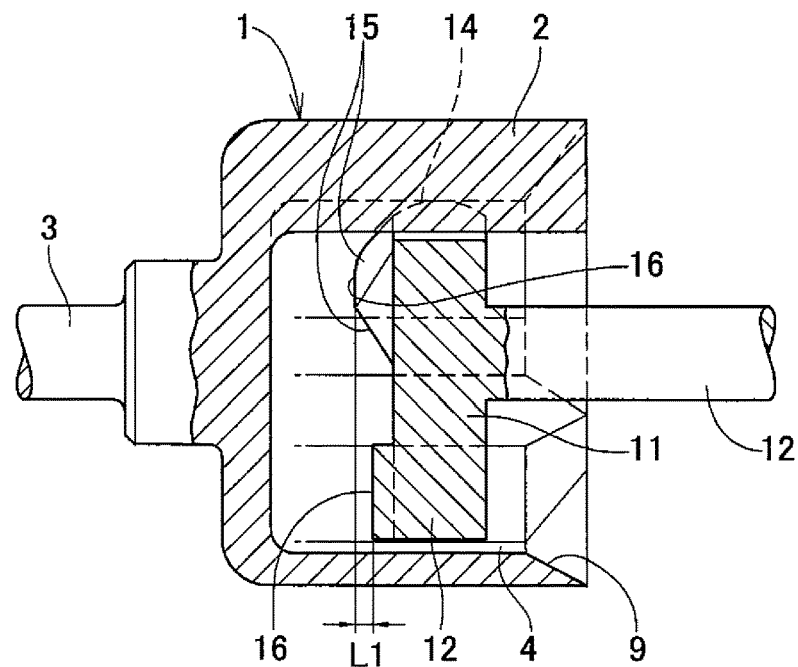
FIG. 13 is a longitudinal front view of a tripod-type constant velocity joint according to a fourth embodiment of the present invention.
Figure 14:
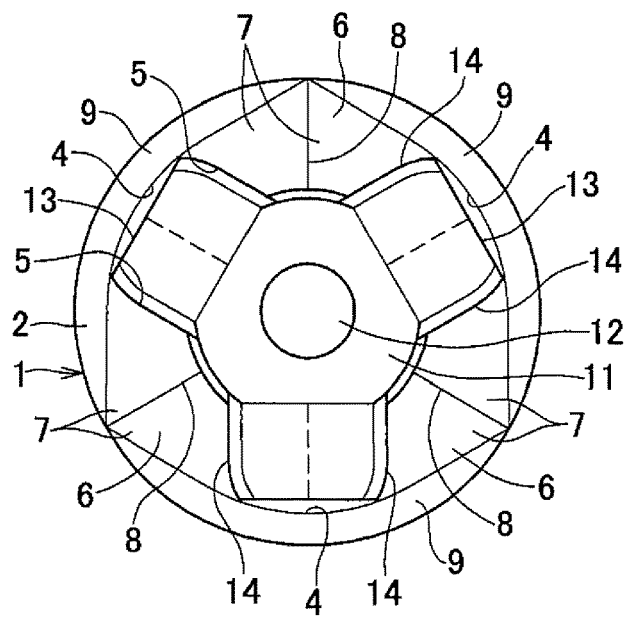
FIG. 14 is a view seen from the right side of the joint of FIG. 13.
Figure 15:
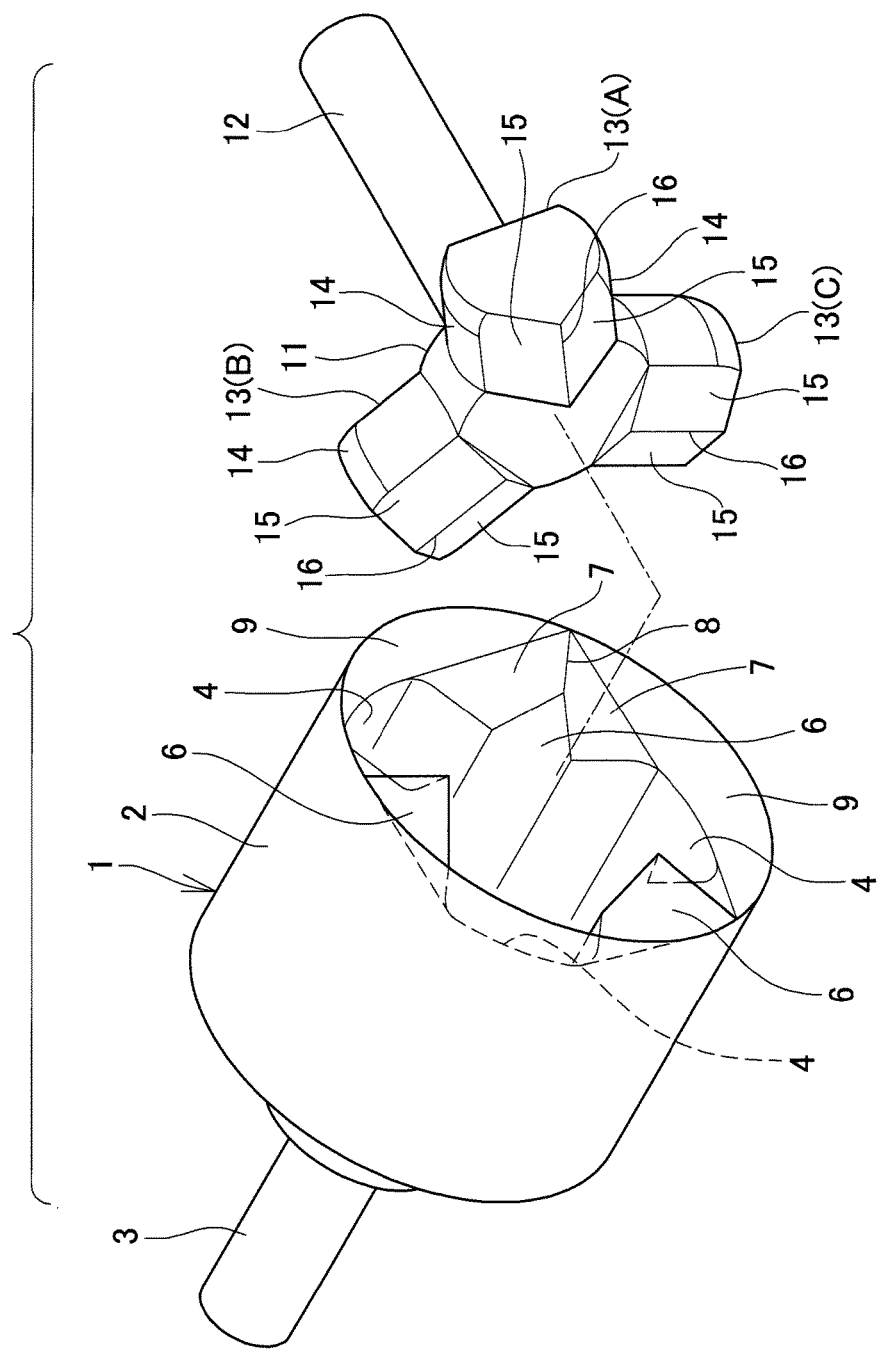
FIG. 15 is an exploded perspective view illustrating the outer ring and the tripod member of the joint according to the fourth embodiment.

FIGS. 13 to 15 illustrate a tripod-type constant velocity joint according to the fourth embodiment of the present invention. This tripod-type constant velocity joint is constituted by an outer ring 1 and a tripod member 11 inserted inside of the outer ring 1.

The outer ring 1 includes a cup portion 2 having an open end and a closed end, and a first shaft 3 mounted at the closed end of the cup portion 2. The cup portion 2 is formed in its inner periphery with three track grooves 4 axially extending from the open end of the cup portion 2, and circumferentially arranged at intervals of 120 degrees. Each track groove 4 has a circumferentially opposed pair of side surfaces 5 which are flat surfaces extending in parallel to each other.

The tripod member 11 includes a second shaft 12, and is integrally formed with three protrusions 13 inserted in the respective track grooves 4 of the outer ring 1.

The protrusions 13 are axially slidable in the respective track grooves 4. Each protrusion 13 is formed on both sides thereof with side surfaces 14 opposed to the respective side surfaces 5 of the corresponding track groove 4. The side surfaces 14 are cylindrical surfaces curved along the axial direction of the tripod member 11. In the fourth embodiment, the cylindrical surfaces of each protrusion 13, which are opposite from each other, have a common center axis extending in the radial direction of the tripod member 11, and coinciding with the center axis of the protrusion 13 in the protruding direction of the protrusion 13. The side surfaces 14 may be spherical surfaces curved in two directions, specifically, in the circumferential and axial directions of the tripod member 11.

When torque is input to one of the first shaft 3 and the second shaft 12, at least one of the side surfaces 14 on both sides of each protrusion 13 engages with one of the side surfaces 5 of the corresponding track groove 4, so that torque around the center axes thereof is transmitted between the outer ring 1 and the tripod member 11.

In this state, when the center axes of the outer ring 1 and the tripod member 11 are inclined relative to each other, the side surfaces 14 of the protrusion 13 slide on the side surfaces 5 of the track grooves 4 while kept in contact with the side surfaces 5, so that the outer race 1 and the tripod member 11 can be smoothly inclined or swiveled relative to each other.

When torque is transmitted with the center axes of the first shaft 3 and the second shaft 12 inclined relative to each other, the protrusions 13 slide along the respective track grooves 4 in the axial direction of the outer ring 1. At this time, since the side surfaces 14 of the protrusions 13 are kept in line contact (or point contact if the side surfaces 14 are spherical surfaces) with the side surfaces 5 of the track grooves 4, the slide resistance is small, so that the protrusions 13 smoothly slide along the respective tack grooves 4. Therefore, even when the center axes of the first shaft 3 and the second shaft 12 are inclined relative to each other to a large degree, the constant velocity joint can rotate at a constant speed, that is, its rotational speed does not fluctuate.

The outer ring 1 has bulges 6 formed between the respective adjacent track grooves 4. Each bulge 6 has a pair of tapered surfaces 7 formed at its distal end (end on the open side of the outer ring 1). Each pair of tapered surfaces 7 are inclined so as to enter the interior of the outer ring 1 from their outer diameter sides toward their inner diameter sides, and further inclined in circumferentially opposite directions to each other so as to define an apex 8 at the center of the corresponding bulge 6 with respect to its circumferential width. Each apex 8 is constituted by a straight ridgeline extending in the radial direction of the outer ring 1. The tapered surfaces 7 may be flat surfaces or convex surfaces.

The outer ring 1 is formed in the outer peripheral portion of the open end surface of the outer ring 1 with three tapered surfaces 9 each having both ends thereof located, respectively, at the centers of two of the bulges 6 with respect to their circumferential widths. Namely, the tapered surfaces 9 are formed at the distal end portions of the bulges 6, formed between the respective adjacent track grooves 4 of the outer ring 1, and extend obliquely radially inwardly into the interior of the outer ring 1.

Each protrusion 13 of the tripod member 11 has a pair of tapered surfaces 15 formed on its front side portion, which is first inserted into the outer ring 1 when assembling the joint by inserting the tripod member 11 into the outer ring 1 from its open end. The pair of tapered surfaces 15 of each protrusion 13 are inclined from the widthwise center of the protrusion 13 toward both sides thereof so as to define an apex 16 at the widthwise center of the protrusion 13. Each apex 16 is constituted by a straight ridgeline extending in the radial direction of the tripod member 11. The tapered surfaces 15 may be flat surfaces or convex surfaces.

When the outer ring 1 and the tripod member 11 are connected together, each of the apexes 16 of the protrusions 13, which are circumferentially arranged at intervals of 120 degrees around the center axis of the tripod member 11, is first brought into abutment with one of the tapered surfaces 7, which define therebetween the apex 8 of the corresponding one of the bulges 6, which are similarly circumferentially arranged at intervals of 120 degrees, and is then guided along this tapered surface 7 into the corresponding track groove 4. At this time, in some cases, the apexes 16 may be first brought into abutment with the respective tapered surfaces 9, and then guided along the tapered surfaces 7.

However, when the outer ring 1 and the tripod member 11 are connected together, if the apexes 16 of the protrusions 13 are aligned with the respective apexes 8 of the bulges 6, the three apexes 16 are supported by the respective three apexes 8, so that the apexes 16 cannot be guided along the tapered surfaces 7, and also the apexes 8 and 16 kept in abutment with each other might be damaged if a pushing force larger than expected is applied thereto. In order to avoid such "three-point support" between the apexes 8 and the respective apexes 16, the outer ring 1 and the tripod member 11 may have one of the below-described first and second structures.

As the first structure, the apex 8 of at least one of the three bulges 6, formed on the outer ring 1, can be set to be axially displaced from the apexes 8 of the other bulges 6. This can avoid the above "three-point support". As the first structure, one of the following three specific arrangements can be chosen: (1) arrangement in which two of the three apexes 8 are at the same axial position, and the other of the three apexes 8 is located axially forward of the two apexes 8 (located on the open end side of the outer ring 1); (2) arrangement in which two of the three apexes 8 are at the same axial position, and the other of the three apexes 8 is located axially rearward of the two apexes 8 (located on the closed end side of the outer ring 1); and (3) arrangement in which the axial positions of the three apexes 8 are all different from each other. In case the first structure is used, the apexes 16 of the three protrusions 13 of the tripod member 11 are arranged such that the three apexes 16 do not simultaneously abut against the respective apexes 8 of the bulges 6. This can be realized, for example, by arranging the three apexes 16 at the same axial position.

As the second structure, the apex 16 of at least one of the three protrusions 13, formed on the tripod member 11, can be set to be axially displaced from the apexes 16 of the other protrusions 13. This can avoid the above "three-point support". As the second structure, one of the following three specific arrangements can be chosen: (1) arrangement in which two of the three apexes 16 are at the same axial position, and the other of the three apex 16 is located axially forward of the two apexes 16; (2) arrangement in which two of the three apexes 16 are at the same axial position, and the other of the three apexes 16 is located axially rearward of the two apexes 16; and (3) arrangement in which the axial positions of the three apexes 16 are all different from each other. In case the second structure is used, the apexes 8 of the three bulges 6 of the outer ring 1 are arranged such that the three apexes 8 do not simultaneously abut against the respective apexes 16 of the protrusions 13. This can be realized, for example, by arranging the three apexes 8 at the same axial position.

FIGS. 13 to 15 illustrate the arrangement in which the apex 16 of one ("13(A)" in FIG. 15) of the three protrusions 13, formed on the tripod member 11, is located axially forward of the apexes 16 of the other two protrusions 13 ("13(B) and 13(C)" in FIG. 15) by a distance L1, with the apexes 16 of the other two protrusions 13(B) and 13(C) located at the same axial position. In this arrangement, the apexes 8 of the three bulges 6 of the outer ring 1 are all set to be at the same axial position, so that it is possible to avoid the "three-point support" between the apexes 8 and the respective apexes 16.

Fifth Embodiment

Figure 16:
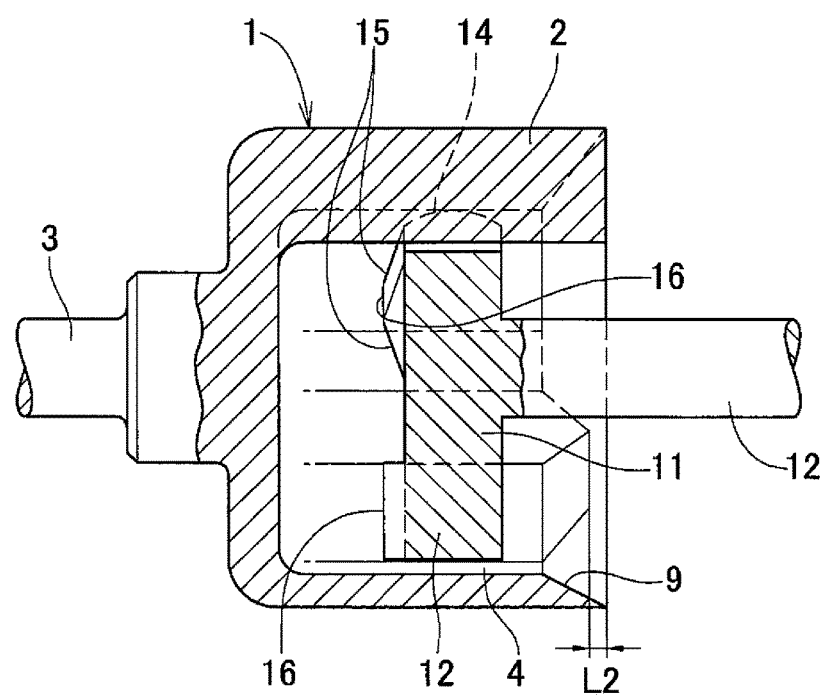
FIG. 16 is a longitudinal front view of a tripod-type constant velocity joint according to a fifth embodiment of the present invention.
Figure 17:
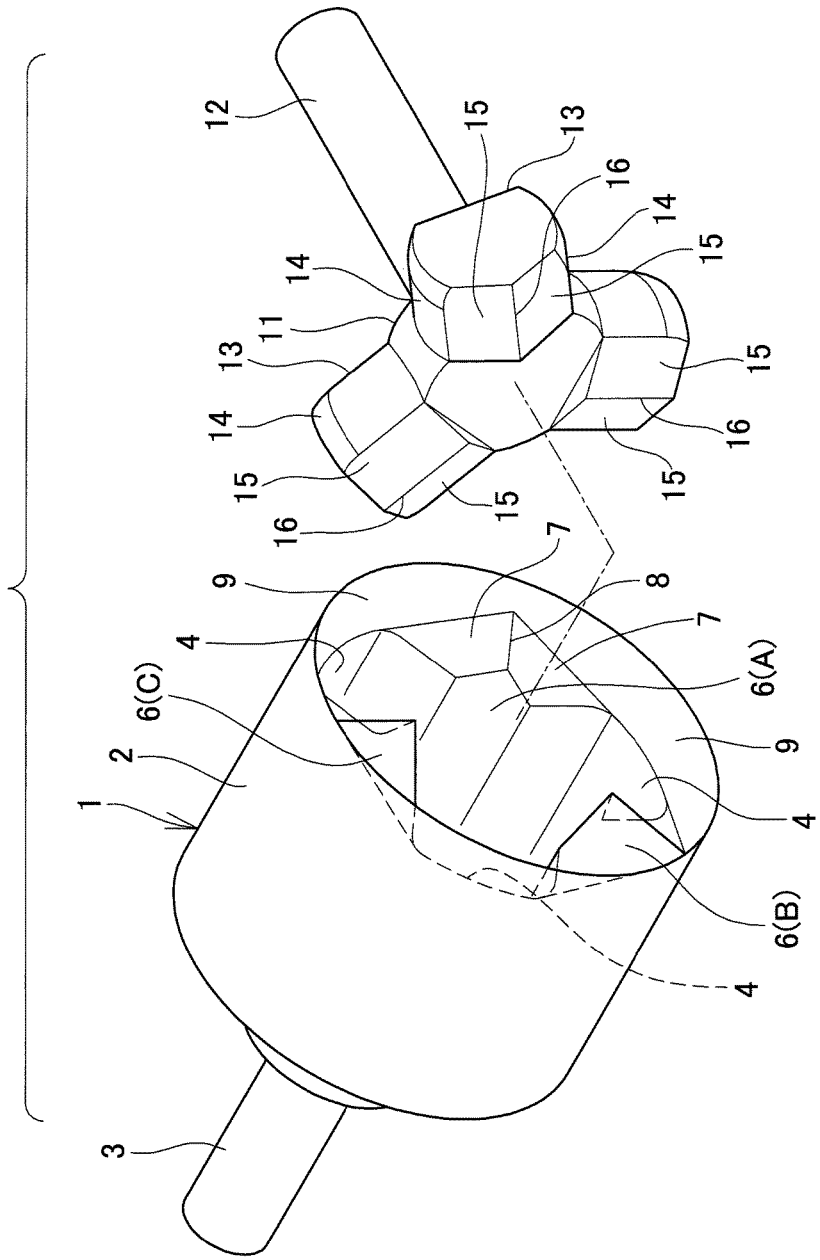
FIG. 17 is an exploded perspective view illustrating the outer ring and the tripod member of the joint according to the fifth embodiment.

FIGS. 16 and 17 illustrate the arrangement in which the apex 8 of one ("6(A)" in FIG. 17) of the three bulges 6, formed on the outer ring 1, is located axially rearward of the apexes 8 of the other two bulges 6 ("6(B) and (6C)" in FIG. 17) by a distance L2, namely, the apexes 8 of the bulges 6(B) and 6(C) are located axially forward of the apex 8 of the bulge 6(A) by a distance L2, with the apexes 8 of the bulges 6(B) and 6(C) located at the same axial position. In this arrangement, the apexes 16 of the three protrusions 13 of the tripod member 11 are all set to be at the same axial position.

With this arrangement, when the outer ring 1 and the tripod member 11 is connected together, the three apexes 8 of the outer ring 1 do not simultaneously come into contact with the respective apexes 16 of the tripod member 11, and the apexes 8 and 16 come into contact with each other in an unstable state, thus making it possible to prevent the "three-point support" between the apexes 8 and the respective apexes 16. Since the apexes 8 are not aligned with the respective apexes 16, namely the above "three-point support" does not arise, it is possible to prevent the phenomenon that the outer ring 1 and the tripod member 11 cannot be smoothly connected together in rare cases. Therefore, in this tripod-type constant velocity joint, it is possible to markedly enhance the guiding effect of the tapered surfaces 7 and 15, and thus to reliably connect the outer ring 1 and the tripod member 11 to each other. Also, since it is not necessary to forcibly push the tripod member 11 into the outer ring 1, the apexes 8 of the bulges 6 and the apexes 16 of the protrusions 13 will not be damaged.

It is also possible to disassemble the tripod-type constant velocity joint by disconnecting the outer ring 1 and the tripod member 11 from each other.

Namely, in this constant velocity joint, it is possible to easily connect the outer ring 1 and the tripod member 11 to each other and disconnect them from each other. Therefore, it is possible to easily replace components on the input side which input motive power to the constant velocity joint, and replace components on the output side which are driven or rotated by the motive power output from the constant velocity joint, for example, if these components break.

In the tripod-type constant velocity joint of the present invention, at least one of the outer ring 1 and the tripod member 11 is made of a synthetic resin. The other of the outer ring 1 and the tripod member 11 may be made of a metal, ceramics or a synthetic resin.

By using such a material(s) in the constant velocity joint, the joint can dispense with a lubricant, thus enabling "dry operation". Since no lubricant is used in the constant velocity joint, the joint can dispense with a boot as well. Also, it is possible to lighten the constant velocity joint and reduce noise. Most preferably, both the outer ring 1 and the tripod member 11 are made of a synthetic resin. If both of them are made of a synthetic resin, it is possible to further lighten the constant velocity joint, and thus to more easily handle the joint. Preferably, the base resin of the outer ring 1 is different from that of the tripod member 11. By using different base resins in this way, it is possible to prevent their adhesion phenomenon. This is applied to all of the above embodiments.

As such a synthetic resin or resins, a suitable one or ones, preferably a suitable one or ones enabling injection molding, are selected in accordance with the use conditions of the tripod-type constant velocity joint. Such a synthetic resin or resins may be thermoplastic or thermosetting, if injection molding can be performed.

As a resin enabling injection molding, there are a crystalline resin and a non-crystalline resin, and both of them can be used. However, since non-crystalline resins do not have sufficient toughness, if the constant velocity joint is made of a non-crystalline resin, and an unallowable amount of torque is applied to the joint, the joint might break rapidly. Therefore, it is preferable to use a crystalline resin.

It is preferable to use a synthetic resin having a high lubrication property, such as polyoxymethylene resin (POM), polyamide resin, fluororesin enabling injection molding (e.g., PFA, FEP, ETFE), thermoplastic polyimide, polyphenylene sulfide resin (PPS), wholly aromatic polyester resin, polyether ether ketone resin (PEEK), or polyamide-imide resin.

Only one of the above-enumerated resins may be used, a polymer alloy may be used in which two or more of the above-enumerated resins are mixed, or a polymer alloy may be used which is formed by combining one of the above-enumerated resins with a synthetic resin having a low lubrication property and belonging to none of the above-enumerated resins.

Even a synthetic resin having a low lubrication property may be used, if its lubrication property is increased by adding a solid lubricant or lubricant oil to the synthetic resin. As such a solid lubricant, polytetrafluoroethylene, graphite, or molybdenum disulfide may be used.

A synthetic resin may be used which is combined with glass fiber, carbon fiber, or various kinds of mineral fiber (whisker) so as to increase its strength. Alternatively, a synthetic resin may be used together with a solid lubricant, etc.

The most suitable material for use in the present invention is POM, nylon resin, PPS, or PEEK. Nylon resin can be used, such as nylon 6, nylon 66, nylon 610, nylon 612, nylon 11, nylon 12, nylon 46, or semi-aromatic nylon having an aromatic ring in its molecular chain. Since POM, nylon resin, and PPS are excellent in heat resistance and lubrication properties, and relatively inexpensive, it is possible to reduce costs for the tripod-type constant velocity joint. The above explanations relating to "material" can be applied to all of the above embodiments.

In the fourth and fifth embodiments, the tripod member 11, the second shaft 12, and the protrusions 13 comprise an integral member made of a synthetic resin. However, the tripod member 11 and the protrusions 13 may be made of a synthetic resin, and the second shaft 12 may be made of ceramics or a metal such as steel, stainless steel, or aluminum alloy.

If the second shaft 12 is relatively long, it is preferable that the second shaft 12 is made of ceramics or a metal so as to prevent toque loss.

Also, the cup portion 2 and the first shaft 3 of the outer ring 1 comprise an integral member made of a synthetic resin. However, the first shaft 3 may be made of ceramics, steel, stainless steel, or aluminum alloy, etc., and be coupled to the cup portion 2.

DESCRIPTION OF REFERENCE NUMERALS

1: outer ring
2: cup portion
3: first shaft
4: track groove
5: side surface
6: bulge
7, 9: tapered surface
8: apex
11: tripod member
12: second shaft
13: protrusion
15: tapered surface
16: apex
21: driving shaft
22: driven shaft (rotary member shaft)
30: tripod-type constant velocity joint
31, 36: outer ring
31a, 36a: shaft portion
31b, 36b, 41a: axial hole
32, 37: track groove
32a, 37a: side surface
33, 38: bulge
33a: tapered surface
33b: apex
34: receiving recess
35: cup-shaped member constituted by two cups
40, 45: tripod member
41: body
42, 47: protrusion
42a: tapered surface
42b: apex
42c, 47b: side surface
47a: apex/top surface
R: rotary portion D: intermediate member
E: shaft end member
F, F': frame
M: driving source (motor)

The invention claimed is:
1. A tripod-type constant velocity joint comprising:
a coupling member through which a driving shaft is coupled to a driven shaft, the coupling member being configured to transmit rotation of the driving shaft to the driven shaft while restraining a change in a rotational speed of the driven shaft when an angle between a center axis of the driving shaft and a center axis of the driven shaft is not 180 degrees, or when a center axis of the driving shaft and a center axis of the driven shaft are offset from each other, wherein the coupling member includes:
an intermediate member;
a first shaft end member connected to a first end of the intermediate member on a side of the driven shaft; and
a second shaft end member connected to a second end of the intermediate member on a side of the driving shaft,
wherein the intermediate member comprises a first outer ring having a first axial end surface and a second outer ring having a second axial end surface,
wherein the first shaft end member comprises a first tripod member having three first protrusions, and the second shaft end member comprises a second tripod member having three second protrusions,
wherein the first outer ring, the second outer ring, the first tripod member, and the second tripod member are all formed of a synthetic resin;
wherein the first outer ring has an inner periphery, the inner periphery of the first outer ring having axially extending first track grooves open at the first axial end surface of the first outer ring, the first track grooves being circumferentially arranged at intervals of 120 degrees, and the second outer ring has an inner periphery, the inner periphery of the second outer ring having axially extending second track grooves open at the second axial end surface of the second outer ring, the second track grooves being circumferentially arranged at intervals of 120 degrees,
wherein the first protrusions of the first tripod member are axially slidably received in the corresponding first track grooves of the first outer ring to form a first connecting portion, and the second protrusions of the second tripod member are axially slidably received in the corresponding second track grooves of the second outer ring to form a second connecting portion, the first connecting portion and the second connecting portion being free of any lubricant leakage preventive member and being configured so that torque around a center axis can be transmitted between the second outer ring and the second tripod member and between the first outer ring and the first tripod member, and
wherein the coupling member is configured such that an amount of force necessary to separate a first one of the first and second tripod members from a corresponding first one of the first and second outer rings is less than an amount of force necessary to separate a second one of the first and second tripod members from a corresponding second one of the first and second outer rings.

2. The tripod-type constant velocity joint according to claim 1, wherein the first outer ring and the second outer ring comprise two cups, an inner surface of a first one of the two cups having the first track grooves, and an inner surface of a second one of the two cups having the second track grooves, the two cups being axially aligned with each other with bottoms of the respective cups abutting against each other.

3. The tripod-type constant velocity joint according to claim 1, wherein the first outer ring has bulges formed between each adjacent pair of first track grooves, and each of the bulges having a pair of tapered surfaces formed at a distal end of the respective bulge so as to be inclined in circumferentially opposite directions to each other so as to define an apex at a center of each of the bulges with respect to a circumferential width of each of the bulges, and
wherein each of the three first protrusions of the first tripod member is opposed to the first outer ring and has a pair of tapered surfaces formed on a front side portion thereof so as to be inclined from a widthwise center of a respective one of the first protrusions toward both sides of the respective one of the first protrusions to define an apex at the widthwise center thereof.

4. The tripod-type constant velocity joint according to claim 3, wherein the apex of at least one of the three first protrusions is axially displaced from the apexes of a remainder of the three first protrusions.

5. The tripod-type constant velocity joint according to claim 3, wherein each of the first and second protrusions has side surfaces on both sides thereof, the side surfaces comprising curved side surfaces curved along an axial direction, the curved side surfaces being opposed to, and in contact with, side surfaces of the corresponding track groove.

6. The tripod-type constant velocity joint according to claim 3, wherein the apex of at least one of the bulges is axially displaced from the apexes of a remainder of the bulges.

7. The tripod-type constant velocity joint according to claim 1, wherein a main component of the synthetic resin of the tripod members is different from a main component of the synthetic resin of the outer rings.

8. A tripod-type constant velocity joint comprising:
a coupling member through which a driving shaft is coupled to a driven shaft, the coupling member being configured to transmit rotation of the driving shaft to the driven shaft while restraining a change in a rotational speed of the driven shaft when an angle between a center axis of the driving shaft and a center axis of the driven shaft is not 180 degrees, or when a center axis of the driving shaft and a center axis of the driven shaft are offset from each other, wherein the coupling member includes:
an intermediate member;
a first shaft end member connected to a first end of the intermediate member on a side of the driven shaft; and
a second shaft end member connected to a second end of the intermediate member on a side of the driving shaft,
wherein the intermediate member comprises a first outer ring having a first axial end surface and a second outer ring having a second axial end surface,
wherein the first shaft end member comprises a first tripod member having three first protrusions, and the second shaft end member comprises a second tripod member having three second protrusions, wherein the first outer ring, the second outer ring, the first tripod member, and the second tripod member are all formed of a synthetic resin;

wherein the first outer ring has an inner periphery, the inner periphery of the first outer ring having axially extending first track grooves open at the first axial end surface of the first outer ring, the first track grooves being circumferentially arranged at intervals of 120 degrees, and the second outer ring has an inner periphery, the inner periphery of the second outer ring having axially extending second track grooves open at the second axial end surface of the second outer ring, the second track grooves being circumferentially arranged at intervals of 120 degrees, wherein the first protrusions of the first tripod member are axially slidably received in the corresponding first track grooves of the first outer ring to form a first connecting portion, and the second protrusions of the second tripod member are axially slidably received in the corresponding second track grooves of the second outer ring to form a second connecting portion, the first connecting portion and the second connecting portion being free of any lubricant leakage preventive member and being configured so that torque around a center axis can be transmitted between the second outer ring and the second tripod member and between the first outer ring and the first tripod member, and wherein the coupling member is configured such that, when the driving member and the driven member are pulled in opposite directions, one of the first tripod member and the second tripod member is axially separated from a corresponding one of the first outer ring and the second outer ring, and wherein a clearance between the first protrusions of the first tripod member and the first outer ring is greater than a clearance between the second protrusions of the second tripod member and the second outer ring.

9. A tripod-type constant velocity joint comprising:

a coupling member through which a driving shaft is coupled to a driven shaft, the coupling member being configured to transmit rotation of the driving shaft to the driven shaft while restraining a change in a rotational speed of the driven shaft when an angle between a center axis of the driving shaft and a center axis of the driven shaft is not 180 degrees, or when a center axis of the driving shaft and a center axis of the driven shaft are offset from each other, wherein the coupling member includes:

an intermediate member;

a first shaft end member connected to a first end of the intermediate member on a side of the driven shaft; and a second shaft end member connected to a second end of the intermediate member on a side of the driving shaft, wherein the intermediate member has a one-piece monolithically-formed construction and comprises a first outer ring having a first axial end surface and a second outer ring having a second axial end surface, the first outer ring being connected to the second outer ring by a wall extending orthogonal to a central axis of the first outer ring and the second outer ring such that the intermediate member is shaped as two axially-aligned cups having respective bottoms abutting each other and respective openings facing away from each other, the wall entirely enclosing an end of each of the first outer ring and the second outer ring such that the respective openings of the two axially-aligned cups do not communicate with each other, wherein the first shaft end member comprises a first tripod member having three first protrusions, and the second shaft end member comprises a second tripod member having three second protrusions, wherein the first outer ring has an inner periphery, the inner periphery of the first outer ring having axially extending first track grooves open at the first axial end surface of the first outer ring, the first track grooves being circumferentially arranged at intervals of 120 degrees, and the second outer ring has an inner periphery, the inner periphery of the second outer ring having axially extending second track grooves open at the second axial end surface of the second outer ring, the second track grooves being circumferentially arranged at intervals of 120 degrees, and wherein the first protrusions of the first tripod member are axially slidably received in the corresponding first track grooves of the first outer ring, and the second protrusions of the second tripod member are axially slidably received in the corresponding second track grooves of the second outer ring so that torque around a center axis can be transmitted between the second outer ring and the second tripod member and between the first outer ring and the first tripod member.

10. The tripod-type constant velocity joint according to claim 9, wherein the first outer ring has bulges formed between each adjacent pair of first track grooves, and each of the bulges having a pair of tapered surfaces formed at a distal end of the respective bulge so as to be inclined in circumferentially opposite directions to each other so as to define an apex at a center of each of the bulges with respect to a circumferential width of each of the bulges, and wherein each of the three first protrusions of the first tripod member is opposed to the first outer ring and has a pair of tapered surfaces formed on a front side portion thereof so as to be inclined from a widthwise center of a respective one of the first protrusions toward both sides of the respective one of the first protrusions to define an apex at the widthwise center thereof.

11. The tripod-type constant velocity joint according to claim 10, wherein the apex of at least one of the three first protrusions is axially displaced from the apexes of a remainder of the three first protrusions.

12. The tripod-type constant velocity joint according to claim 10, wherein each of the first and second protrusions has side surfaces on both sides thereof, the side surfaces comprising curved side surfaces curved along an axial direction, the curved side surfaces being opposed to, and in contact with, side surfaces of the corresponding track groove.

13. The tripod-type constant velocity joint according to claim 10, wherein the apex of at least one of the bulges is axially displaced from the apexes of a remainder of the bulges.

14. The tripod-type constant velocity joint according to claim 9, wherein the first and second tripod members and the first and second outer rings are made of a synthetic resin composition, and a main component of the synthetic resin composition of the tripod members is different from a main component of the synthetic resin composition of the outer rings.

15. A tripod-type constant velocity joint comprising:
a coupling member through which a driving shaft is coupled to a driven shaft, the coupling member being configured to transmit rotation of the driving shaft to the driven shaft while restraining a change in a rotational speed of the driven shaft when an angle between a center axis of the driving shaft and a center axis of the driven shaft is not 180 degrees, or when a center axis of the driving shaft and a center axis of the driven shaft are offset from each other, wherein the coupling member includes:
an intermediate member;
a first shaft end member connected to a first end of the intermediate member on a side of the driven shaft; and
a second shaft end member connected to a second end of the intermediate member on a side of the driving shaft,
wherein the intermediate member has a one-piece construction and comprises a first outer ring having a first axial end surface and a second outer ring having a second axial end surface, the first outer ring being connected to the second outer ring by a wall extending orthogonal to a central axis of the first outer ring and the second outer ring such that the intermediate member is shaped as two axially-aligned cups having respective bottoms abutting each other and respective openings facing away from each other,
wherein the first shaft end member comprises a first tripod member having three first protrusions, and the second shaft end member comprises a second tripod member having three second protrusions,
wherein the first outer ring has an inner periphery, the inner periphery of the first outer ring having axially extending first track grooves open at the first axial end surface of the first outer ring, the first track grooves being circumferentially arranged at intervals of 120 degrees, and the second outer ring has an inner periphery, the inner periphery of the second outer ring having axially extending second track grooves open at the second axial end surface of the second outer ring, the second track grooves being circumferentially arranged at intervals of 120 degrees,
wherein the first protrusions of the first tripod member are axially slidably received in the corresponding first track grooves of the first outer ring, and the second protrusions of the second tripod member are axially slidably received in the corresponding second track grooves of the second outer ring so that torque around a center axis can be transmitted between the second outer ring and the second tripod member and between the first outer ring and the first tripod member, and
wherein a clearance between the first protrusions of the first tripod member and the first outer ring is greater than a clearance between the second protrusions of the second tripod member and the second outer ring.

16. A tripod-type constant velocity joint comprising:
a coupling member through which a driving shaft is coupled to a driven shaft, the coupling member being configured to transmit rotation of the driving shaft to the driven shaft while restraining a change in a rotational speed of the driven shaft when an angle between a center axis of the driving shaft and a center axis of the driven shaft is not 180 degrees, or when a center axis of the driving shaft and a center axis of the driven shaft are offset from each other, wherein the coupling member includes:
an intermediate member;
a first shaft end member connected to a first end of the intermediate member on a side of the driven shaft; and
a second shaft end member connected to a second end of the intermediate member on a side of the driving shaft,
wherein the intermediate member has a one-piece construction and comprises a first outer ring having a first axial end surface and a second outer ring having a second axial end surface, the first outer ring being connected to the second outer ring by a wall extending orthogonal to a central axis of the first outer ring and the second outer ring such that the intermediate member is shaped as two axially-aligned cups having respective bottoms abutting each other and respective openings facing away from each other,
wherein the first shaft end member comprises a first tripod member having three first protrusions, and the second shaft end member comprises a second tripod member having three second protrusions,
wherein the first outer ring has an inner periphery, the inner periphery of the first outer ring having axially extending first track grooves open at the first axial end surface of the first outer ring, the first track grooves being circumferentially arranged at intervals of 120 degrees, and the second outer ring has an inner periphery, the inner periphery of the second outer ring having axially extending second track grooves open at the second axial end surface of the second outer ring, the second track grooves being circumferentially arranged at intervals of 120 degrees,
wherein the first protrusions of the first tripod member are axially slidably received in the corresponding first track grooves of the first outer ring, and the second protrusions of the second tripod member are axially slidably received in the corresponding second track grooves of the second outer ring so that torque around a center axis can be transmitted between the second outer ring and the second tripod member and between the first outer ring and the first tripod member,
wherein the first outer ring has bulges formed between each adjacent pair of first track grooves, and each of the bulges having a pair of tapered surfaces formed at a distal end of the respective bulge so as to be inclined in circumferentially opposite directions to each other so as to define an apex at a center of each of the bulges with respect to a circumferential width of each of the bulges,
wherein each of the three first protrusions of the first tripod member is opposed to the first outer ring and has a pair of tapered surfaces formed on a front side portion thereof so as to be inclined from a widthwise center of a respective one of the first protrusions toward both sides of the respective one of the first protrusions to define an apex at the widthwise center thereof, and
wherein the apex of at least one of the three first protrusions is axially displaced from the apexes of a remainder of the three first protrusions.

17. A tripod-type constant velocity joint comprising:
a coupling member through which a driving shaft is coupled to a driven shaft, the coupling member being configured to transmit rotation of the driving shaft to the driven shaft while restraining a change in a rotational speed of the driven shaft when an angle between a center axis of the driving shaft and a center axis of the driven shaft is not 180 degrees, or when a center axis of the driving shaft and a center axis of the driven shaft are offset from each other, wherein the coupling member includes:
an intermediate member;
a first shaft end member connected to a first end of the intermediate member on a side of the driven shaft; and
a second shaft end member connected to a second end of the intermediate member on a side of the driving shaft,
wherein the intermediate member has a one-piece construction and comprises a first outer ring having a first axial end surface and a second outer ring having a second axial end surface, the first outer ring being connected to the second outer ring by a wall extending orthogonal to a central axis of the first outer ring and the second outer ring such that the intermediate member is shaped as two axially-aligned cups having respective bottoms abutting each other and respective openings facing away from each other,
wherein the first shaft end member comprises a first tripod member having three first protrusions, and the second shaft end member comprises a second tripod member having three second protrusions,
wherein the first outer ring has an inner periphery, the inner periphery of the first outer ring having axially extending first track grooves open at the first axial end surface of the first outer ring, the first track grooves being circumferentially arranged at intervals of 120 degrees, and the second outer ring has an inner periphery, the inner periphery of the second outer ring having axially extending second track grooves open at the second axial end surface of the second outer ring, the second track grooves being circumferentially arranged at intervals of 120 degrees,
wherein the first protrusions of the first tripod member are axially slidably received in the corresponding first track grooves of the first outer ring, and the second protrusions of the second tripod member are axially slidably received in the corresponding second track grooves of the second outer ring so that torque around a center axis can be transmitted between the second outer ring and the second tripod member and between the first outer ring and the first tripod member,
wherein the first outer ring has bulges formed between each adjacent pair of first track grooves, and each of the bulges having a pair of tapered surfaces formed at a distal end of the respective bulge so as to be inclined in circumferentially opposite directions to each other so as to define an apex at a center of each of the bulges with respect to a circumferential width of each of the bulges,
wherein each of the three first protrusions of the first tripod member is opposed to the first outer ring and has a pair of tapered surfaces formed on a front side portion thereof so as to be inclined from a widthwise center of a respective one of the first protrusions toward both sides of the respective one of the first protrusions to define an apex at the widthwise center thereof,
wherein the apex of at least one of the bulges is axially displaced from the apexes of a remainder of the bulges.

\* \* \* \* \*